US009580266B1

(12) United States Patent
Bell'Albero et al.

(10) Patent No.: US 9,580,266 B1
(45) Date of Patent: Feb. 28, 2017

(54) MULTI-PATH MEDIA DIVERTER SYSTEM FOR AN IMAGING DEVICE

(71) Applicant: LEXMARK INTERNATIONAL, INC., Lexington, KY (US)

(72) Inventors: Julian Ariel Bell'Albero, Lexington, KY (US); Jayron Malicsi Dela Cruz, Lapu Lapu (PH); Kevin Matthew Johnson, Georgetown, KY (US); Brian Keith Owens, Lexington, KY (US); Roel Firmeza Pantonial, Cebu (PH); Marvin Aliviado Rodriguez, Talisay (PH); Donald Norman Spitz, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 0 days.

(21) Appl. No.: 14/922,407

(22) Filed: Oct. 26, 2015

(51) Int. Cl.
| | |
|---|---|
| *B65H 29/60* | (2006.01) |
| *B65H 5/26* | (2006.01) |
| *B65H 7/02* | (2006.01) |
| *F16H 25/16* | (2006.01) |

(52) U.S. Cl.
CPC ............. *B65H 29/60* (2013.01); *B65H 5/26* (2013.01); *B65H 7/02* (2013.01); *B65H 2301/44552* (2013.01); *B65H 2408/111* (2013.01); *F16H 25/16* (2013.01)

(58) Field of Classification Search
CPC .......... B65H 29/60; B65H 29/58; B65H 5/26; B65H 2301/44552; B65H 2408/111
USPC ....................................................... 271/303
See application file for complete search history.

(56) References Cited

U.S. PATENT DOCUMENTS

| | | | | | |
|---|---|---|---|---|---|
| 4,228,995 | A | * | 10/1980 | Breuers | B07C 3/00 271/291 |
| 5,104,118 | A | * | 4/1992 | Hamanaka | B65H 39/11 271/297 |
| 5,810,353 | A | * | 9/1998 | Baskette | B65H 29/60 271/279 |
| 6,206,369 | B1 | * | 3/2001 | Hoshii | B65H 39/11 271/290 |
| 6,325,371 | B1 | * | 12/2001 | Araki | B65H 29/60 270/58.22 |
| 6,443,449 | B1 | * | 9/2002 | Takagi | B65H 31/22 271/279 |

(Continued)

FOREIGN PATENT DOCUMENTS

DE          3808333 A1 * 9/1989 ............. B65H 29/60

*Primary Examiner* — Patrick Cicchino
(74) *Attorney, Agent, or Firm* — John Victor Pezdek

(57) ABSTRACT

A media diverter system for an imaging device including a single motor coupled to one of a plurality of diverter assemblies for sequentially directing media sheets from an input path to one of a plurality of output destinations. Each diverter assembly includes a gate moveable between a first and a second position for opening a path between an input and a first and a second output, respectively, a pivot arm coupled to the gate, and a drive gear providing a lobe having up and down camming surfaces on which the pivot arm travels. The single drive motor rotatably is coupled to the drive gears, and, as the drive motor is driven, the drive gears synchronously rotate and corresponding gates are moved to one of a first and a second position for providing a media path from an input of the system to a selected one of the output destinations.

22 Claims, 14 Drawing Sheets

(56) References Cited

U.S. PATENT DOCUMENTS

| | | | | |
|---|---|---|---|---|
| 7,976,021 B2* | 7/2011 | Matsuo | ................. | B65H 29/58 |
| | | | | 271/297 |
| 8,061,712 B2* | 11/2011 | Tsuji | ..................... | B65H 29/58 |
| | | | | 271/303 |
| 8,276,912 B2* | 10/2012 | Yang | ..................... | B65H 29/58 |
| | | | | 271/298 |
| 8,297,427 B2* | 10/2012 | Oie | ........................ | B65H 3/44 |
| | | | | 194/206 |
| 9,022,387 B2* | 5/2015 | Lee | ...................... | B65H 29/14 |
| | | | | 271/279 |

* cited by examiner

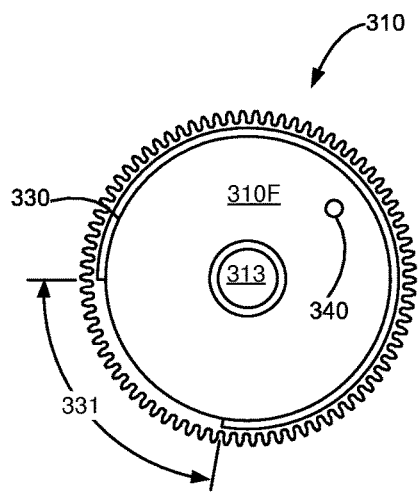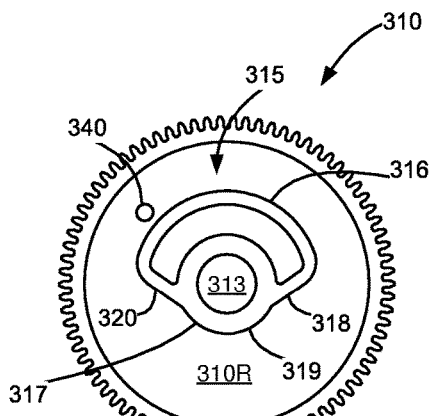
Figure 5A          Figure 5B
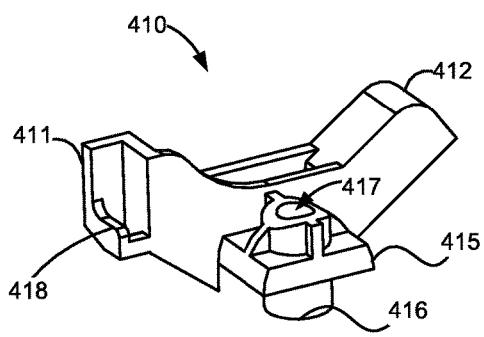
Figure 6

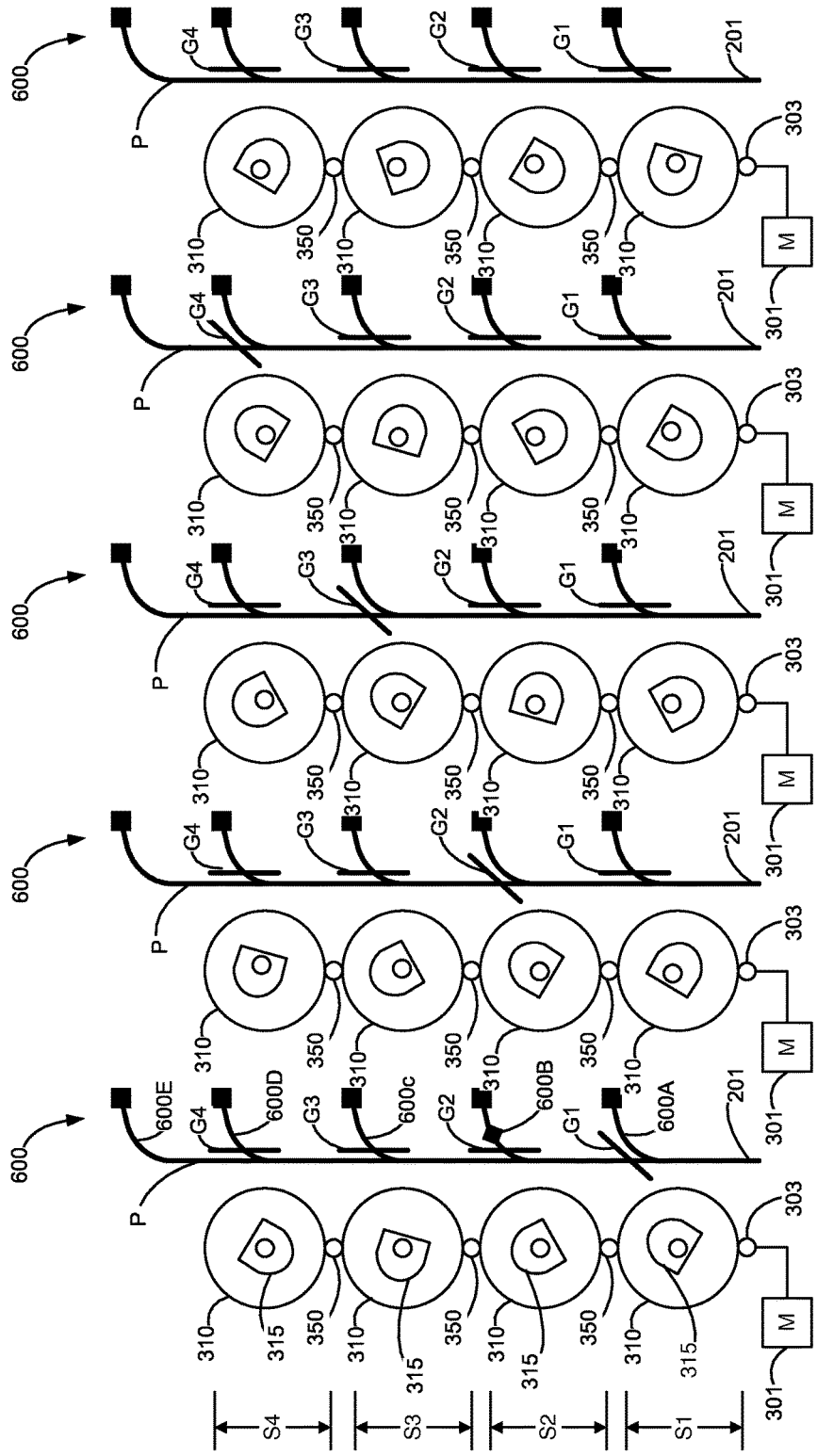

MULTI-PATH MEDIA DIVERTER SYSTEM FOR AN IMAGING DEVICE

CROSS REFERENCES TO RELATED APPLICATIONS

None.

REFERENCE TO SEQUENTIAL LISTING, ETC.

None.

BACKGROUND

1. Field of the Invention

The field relates generally to media diverter systems, and in particular, to a media diverter system for an imaging device that uses a single stepper motor for directing media being fed into the diverter system to a selected one of multiple output destinations.

2. Description of the Related Art

Diverter gates are responsible for diverting media in a paper path system of an image forming device (i.e., printer, scanner, and photocopier) to corresponding output destinations therein. These diverter gates are actuated by prime movers for opening and closing at particular instances during media transport. One example of a prime mover in a diverter system is a solenoid. Often, one solenoid is assigned for each diverter gate in the diverter system for actuating the diverter gate when required. However, the quality of operation of a solenoid degrades in a heated environment, such as that found near a fusing assembly in an imaging device, as compared to other prime movers such as stepper motors and servos.

In an alternative arrangement to having a solenoid as a prime mover, a stepper motor may be used for diverting media sheets to their corresponding output destinations in the imaging device. In contrast to solenoids, stepper motors do not have thermal issues, but as there may be multiple destinations or paths in the imaging device, there may be a need to provide one stepper motor to each path separation, which is costly. Further, positioning a stepper motor at each media path separation would also require additional mounting components, thereby incurring more costs and increasing the size of the media diverter system.

Therefore, it would be advantageous to have a media diverter system that may be operated using a single stepper motors to provide multiple path separations. It would be further advantageous to make use of the bidirectional flexibility and positional repeatability of a stepper motor.

SUMMARY OF THE INVENTION

A multi-path media diverter system for selectively directing a media sheet from a media path to one of a predetermined plurality of output destinations is disclosed. The media diverter system comprises a frame and a first and at least one second stage diverter assembly. Each of the first and the at least one second stage diverter assembly has an input and a first and a second output. An input of the first stage diverter assembly is in communication with a media path sized to receive the media sheet, while an input of the at least one second stage diverter assembly is in communication with at least one of the first and the second output of the first stage diverter assembly. One of the first and the second output of the at least one second stage diverter assembly is in communication with one of the predetermined plurality of output destinations, while the other one of the outputs is in communication with a downstream or second second stage diverter assembly.

Each of the first and the at least one second stage diverter assemblies comprises a gate, a drive gear, a biasing member, and a drive mechanism having one stepper motor. The gate includes a shaft rotatably mounted to the frame, a media deflector member or ribs, and a pivot arm radially extending from the shaft having two ends. The gate extends across the media path and is moveable between a first and a second position for directing the media sheet to the first or the second output. The drive gear has at least one lobe extending axially from a face thereof and each lobe has at least one first (up) and a second (down) camming surface for engaging with an end of the pivot arm. The biasing member has a first end attached to the frame and a second end attached to another end of the pivot arm for biasing the gate toward one of the first and the second positions. When a first end of the pivot arm is on the first camming surface, the gate is in one of the first and the second positions and when the first end of the pivot arm is on the second camming surface, the gate is in the other of the first and the second positions. The drive gears of the media diverter system are either rotatably coupled together via an idler gear and/or an output gear connected to the drive mechanism having a single drive motor for controlling operation of the first stage and at least one second stage diverter assemblies. When the drive mechanism is driven, the drive gears are moved accordingly in a synchronous manner, resulting in an input of the first stage diverter assembly to be sequentially connected to each output destination in the predetermined plurality of output destinations for directing the media sheet.

BRIEF DESCRIPTION OF THE DRAWINGS

The above-mentioned and other features and advantages of this invention, and the manner of attaining them, will become more apparent and the invention will be better understood by reference to the following description of embodiments of the invention taken in conjunction with the accompanying drawings.

FIGS. 5A-5B are front and rear views of a drive gear used in the diverter assembly of FIG. 3.

FIG. 6 is a side perspective view of a pivot arm that engages with the drive gear of FIGS. 5A and 5B.

FIGS. 11A-11E show an alternative arrangement of the diverter assemblies in the media diverter system.

DETAILED DESCRIPTION

Figure 1:
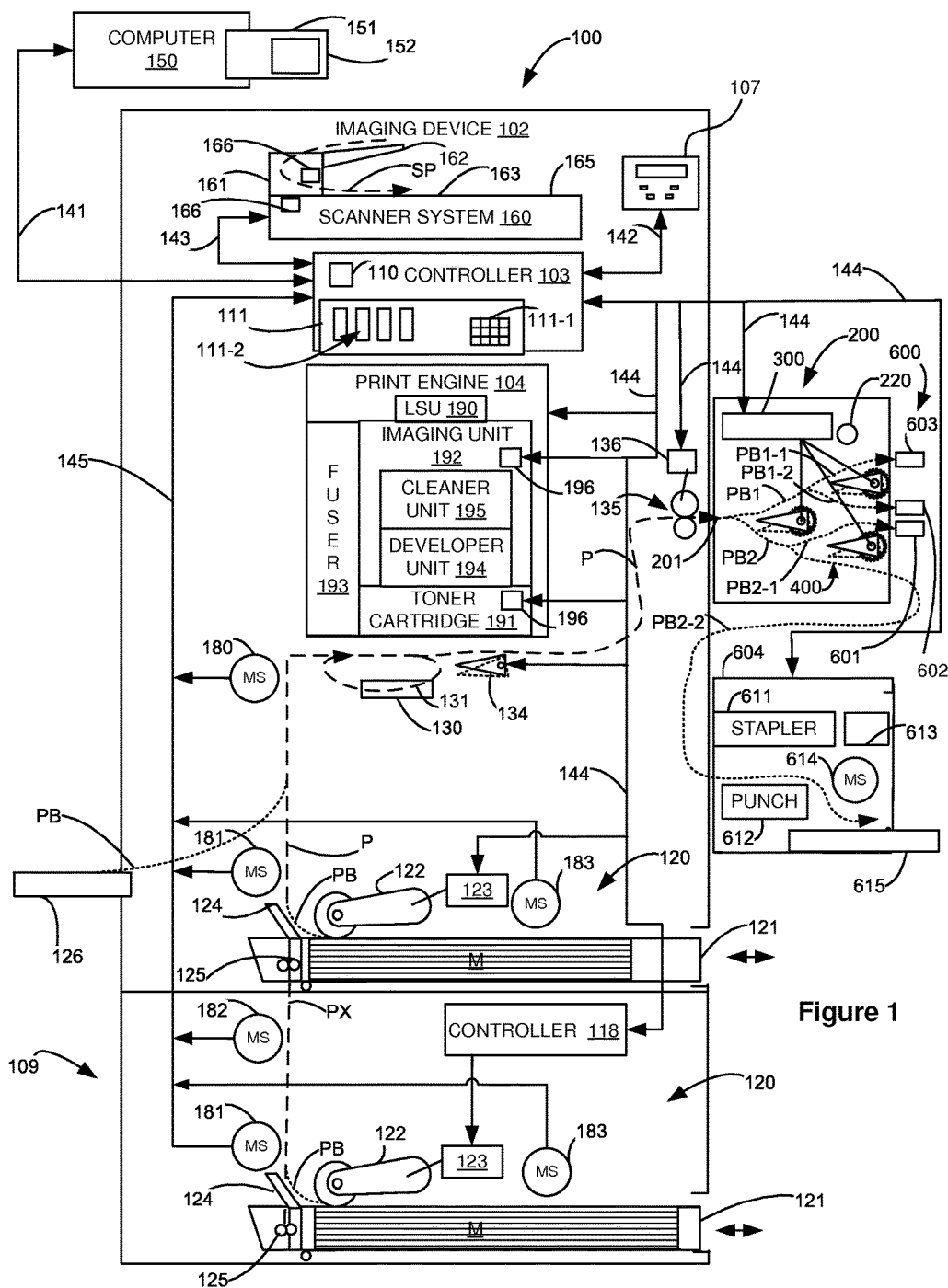
FIG. 1 is a schematic illustration of an imaging device having a media diverter system according to the present disclosure.

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting. As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise. The use of "including," "comprising," or "having" and variations thereof herein is meant to encompass the items listed thereafter and equivalents thereof as well as additional items. Terms such as "about" and the like are used to describe various characteristics of an object, and such terms have their ordinary and customary meaning to persons of ordinary skill in the pertinent art.

Terms such as "about" and the like have a contextual meaning, are used to describe various characteristics of an object, and such terms have their ordinary and customary meaning to persons of ordinary skill in the pertinent art. Terms such as "about" and the like, in a first context mean "approximately" to an extent as understood by persons of ordinary skill in the pertinent art; and, in a second context, are used to describe various characteristics of an object, and in such second context mean "within a small percentage of" as understood by persons of ordinary skill in the pertinent art.

Unless limited otherwise, the terms "connected," "coupled," and "mounted," and variations thereof herein are used broadly and encompass direct and indirect connections, couplings, and mountings. In addition, the terms "connected" and "coupled" and variations thereof are not restricted to physical or mechanical connections or couplings. Spatially relative terms such as "top", "bottom", "front", "back", "rear", "side", "under", "below", "lower", "over", "upper", and the like, are used for ease of description to explain the positioning of one element relative to a second element. These terms are intended to encompass different orientations of the device in addition to different orientations than those depicted in the figures. Further, terms such as "first", "second", and the like, are also used to describe various elements, regions, sections, etc., and are also not intended to be limiting. Like terms refer to like elements throughout the description. Further, relative positional terms are used herein. For example, "superior" means that an element is above another element. Conversely "inferior" means that an element is below or beneath another element. The explanations of these terms along with the use of the terms "top", "bottom", "front", "rear", "left", "right", "up" and "down" are made to aid in understanding the spatial relationship of the various components and are not intended to be limiting.

In addition, it should be understood that embodiments of the present disclosure include both hardware and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic aspects of the invention may be implemented in software. As such, it should be noted that a plurality of hardware and software-based devices, as well as a plurality of different structural components may be utilized to implement the invention. Furthermore, and as described in subsequent paragraphs, the specific mechanical configurations illustrated in the drawings are intended to exemplify embodiments of the present disclosure and that other alternative mechanical configurations are possible.

The term "image" as used herein encompasses any printed or electronic form of text, graphics, or a combination thereof. "Media" or "media sheet" refers to a material that receives a printed image or, with a document to be scanned, a material containing a printed image. The media is said to move along a media path, a media branch, and a media path extension from an upstream location to a downstream location as it moves from the media trays to the output area of the imaging system. For a top feed option tray, the top of the option tray is downstream from the bottom of the option tray. Conversely, for a bottom feed option tray, the top of the option tray is upstream from the bottom of the option tray. As used herein, the leading edge of the media is that edge which first enters the media path and the trailing edge of the media is that edge that last enters the media path. Depending on the orientation of the media in a media tray, the leading/trailing edges may be the short edge of the media or the long edge of the media, in that most media is rectangular. As used herein, the term "media width" refers to the dimension of the media that is transverse to the direction of the media path. The term "media length" refers to the dimension of the media that is aligned to the direction of the media path. "Media process direction" describes the movement of media within the imaging system, and generally is from an input toward an output of the imaging system. Further, relative positional terms may be used herein. For example, "superior" means that an element is above another element. Conversely "inferior" means that an element is below or beneath another element Media is conveyed using pairs of aligned rolls forming feed nips. The term "nip" is used in the conventional sense to refer to the opening formed between two rolls that are located at about the same point in the media path. The rolls forming the nip may be separated apart, be tangent to each other, or form an interference fit with one another. With these nip types, the axes of the rolls are parallel to one another and are typically, but do not have to be, transverse to the media path. For example, a deskewing nip may be at an acute angle with respect to the media feed path. The term "separated nip" refers to a nip formed between two rolls that are located at different points along the media path and have no common point of tangency with the media path. Again, the axes of rotation of the rolls having a separated nip are parallel but are offset from one another along the media path. Nip gap refers to the space between two rolls. Nip gaps may be positive, where there is an opening between the two rolls, zero, where the two rolls are tangentially touching, or negative, where there is an interference fit between the two rolls.

As used herein, the term "communication link" is used to generally refer to a structure that facilitates electronic communication between multiple components. While several communication links are shown, it is understood that a single communication link may serve the same functions as the multiple communication links that are illustrated. Accordingly, a communication link may be a direct electrical wired connection, a direct wireless connection (e.g., infrared or r.f.), or a network connection (wired or wireless), such as for example, an Ethernet local area network (LAN) or a wireless networking standard, such as IEEE 802.11. Devices interconnected by a communication link may use a standard communication protocol, such as for example, universal serial bus (USB), Ethernet or IEEE 802.xx, or other communication protocols. The terms "input" and "output" when applied to a sensor, circuit or other electronic device means an electrical signal that is produced by or is acted upon by such sensor, circuit or electronic device. Such electrical signals may be analog or digital signals.

Referring now to the drawings and particularly to FIG. 1, there is shown a diagrammatic depiction of an example imaging system 100. As shown, imaging system 100 may include an imaging device 102, and an optional computer 150 attached to the imaging device 102. Imaging system 100 may be, for example, a customer imaging system, or alternatively, a development tool used in imaging device design. Imaging device 102 is shown as a multifunction machine that includes a controller 103, a print engine 104, a scanner system 160, a user interface 107, a finisher 604, an option assembly 109 and a media diverter system 200 for directing media to one of a plurality of destinations, generally indicated as 600. The plurality of destinations may include a standard output bin 601, one or more mailboxes, such as destinations 602, 603, and a finisher 604.

Controller 103 includes a processor unit 110 and associated memory 111, and may be formed as one or more Application Specific Integrated Circuits (ASICs). Memory 111 may be any volatile or non-volatile memory or combination thereof such as, for example, random access memory (RAM), read only memory (ROM), flash memory and/or non-volatile RAM (NVRAM). Alternatively, memory 111 may be in the form of a separate electronic memory (e.g., RAM, ROM, and/or NVRAM), a hard drive, a CD or DVD drive, or any memory device convenient for use with controller 103. Provided in memory 111 is one or more look-up tables 111-1 and/or firmware modules 111-2 used for control of imaging device 102 and its attachments such as finisher 604 or media diverter system 200.

In FIG. 1, controller 103 is illustrated as being communicatively coupled with computer 150 via communication link 141, with user interface 107 via communication link 142, and with scanner system 160 via communication link 143. Controller 103 is illustrated as being communicatively coupled with print engine 104, finisher 604, including a stapler 611, a hole punch 612, a tamper 613, and one or more media sensors 614, and a media diverter system 200 and its components via communication link 144.

Computer 150 includes in its memory 151 a software program including program instructions that function as an imaging driver 152, e.g., printer/scanner driver software, for imaging device 102. Imaging driver 152 facilitates communication between imaging device 102 and computer 150. One aspect of imaging driver 152 may be, for example, to provide formatted print data to imaging device 102, and, more particularly, to print engine 104 for printing an image. Another aspect of imaging driver 152 may be, for example, to facilitate collection of scanned data from scanner system 160. In some circumstances, it may be desirable to operate imaging device 102 in a standalone mode. In the standalone mode, imaging device 102 is capable of functioning without computer 150. Accordingly, all or a portion of imaging driver 152, or a similar driver, may be located in one or more firmware modules 111-2 within controller 103 of imaging device 102 so as to accommodate printing and/or scanning functionality when operating in the standalone mode.

Print engine 104, scanner system 160, user interface 107, finisher 604 and media diverter system 200 may be controlled by firmware modules, generally designated 111-2, maintained in memory 111 which may be performed by controller 103 or another processing element. Controller 103 may be, for example, a combined printer, scanner, media diverter system, and finisher controller. Controller 103 serves to process print data and to operate print engine 104 and toner cartridge 191 during printing, to operate scanner system 160 and process data obtained via scanner system 160 for printing or transfer the data to computer 150, and to control operation of media diverter system 200 and finisher 604. Controller 103 may provide to computer 150 and/or to user interface 107 various status indications and messages regarding the media, including scanned media and media to be printed, imaging device 102 itself or any of its subsystems, consumables status, etc. Computer 150 may provide operating commands to imaging device 102. Computer 150 may be located nearby imaging device 102 or be remotely connected to imaging device 102 via an internal or external computer network. Imaging device 102 may also be communicatively coupled to other imaging devices.

Scanner system 160 may employ scanning technology as is known in the art including for example, CCD scanners, optical reduction scanners or combinations of these and other scanner types. Scanner system 160 is illustrated as having an automatic document feeder (ADF) 161 having a media input tray 162 and a media output area 163. Two scan bars 166 may be provided—one in ADF 160 and the other in the base 165—to allow for scanning both surfaces of the media sheet as it is fed from media input tray 162 along scan path SP to media output area 163. Imaging device 102 may also be configured to be a printer without scanning.

Finisher 604 may include a stapler 611, a hole punch 612, a tamper 613, one or more media sensors 614, various media reference and alignment surfaces and an output area 615 for holding finished media. Finisher 604 may be one of the output destinations connected to media diverter system 200.

Print engine 104 is illustrated as including a laser scan unit (LSU) 190, a toner cartridge 191, an imaging unit 192, and a fuser 193, all mounted within imaging device 102. Imaging unit 192 and toner cartridge 191 are supported in their operating positions so that toner cartridge 191 is operatively mated to imaging unit 192 while minimizing any unbalanced loading forces applied by the toner cartridge 191 on imaging unit 192. Imaging unit 192 is removably mounted within imaging device 102 and includes a developer unit 194 that houses a toner sump and a toner delivery system. The toner delivery system includes a toner adder roll that provides toner from the toner sump to a developer roll. A doctor blade provides a metered uniform layer of toner on the surface of the developer roll. Imaging unit 192 also includes a cleaner unit 195 that houses a photoconductive drum and a waste toner removal system. An exit port on toner cartridge 191 communicates with an entrance port on developer unit 194 allowing toner to be periodically transferred from toner cartridge 191 to resupply the toner sump in developer unit 194. Both imaging unit 192 and toner cartridge 191 may be replaceable items for imaging device 102. Imaging unit 192 and toner cartridge 191 may each have a memory device 196 mounted thereon for providing component authentication and information such as type of unit, capacity, toner type, toner loading, pages printed, etc. Memory device 196 is illustrated as being in operative communication with controller 103 via communication link 144. While print engine 104 is illustrated as being an electrophotographic printer, those skilled in the art will recognize that print engine 104 may be, for example, an ink jet printer and one or more ink cartridges or ink tanks or a thermal transfer printer; other printer mechanisms and associated image forming material.

The electrophotographic imaging process is well known in the art and, therefore, will be only briefly described. During an imaging operation, laser scan unit 190 creates a latent image by discharging portions of the charged surface of photoconductive drum in cleaner unit 195. Toner is transferred from the toner sump in developer unit 194 to the latent image on the photoconductive drum by the developer roll to create a toned image. The toned image is then transferred either directly to a media sheet received in imaging unit 192 from one of media input trays 121 or to an intermediate transfer member and then to a media sheet. Next, the toned image is fused to the media sheet in fuser 193 and sent via media diverter system 200 to one of the plurality of destinations 600 or to a duplexer 130. Gate 134, illustrated as being in operative communication with controller 103 via communication link 144, is used to direct the media sheet to media diverter system 200 along media path P or back to duplexer 130 along duplex path 131. Toner remnants are removed from the photoconductive drum by the waste toner removal system housed within cleaner unit 195. As toner is depleted from developer unit 194, toner is transferred from toner cartridge 191 into developer unit 194. Controller 103 coordinates these activities including media movement occurring during the imaging process or during finishing.

Controller 103 also communicates with a controller 118 in option assembly 109, via communication link 144, and which is provided within each option assembly 109 that is attached to imaging device 102. Controller 118 operates various motors housed within option assembly 109 that position media for feeding, feed media from media path branches PB into media path P or media path extensions PX, as well as, feed media along media path extensions PX. Controllers 103, 118 control the feeding of media along media path P and control the travel of media along media path P and media path extensions PX.

Imaging device 102 and option assembly 109 each also include a media feed system 120 having a removable media input tray 121 for holding media M to be printed or scanned, a pick mechanism 122, a drive mechanism 123 positioned adjacent removable media input trays 121. Each media input tray 121 also has a media dam assembly 124 and a feed roll assembly 125. In imaging device 102, pick mechanism 122 is mechanically coupled to drive mechanism 123 that is controlled by controller 103 via communication link 144. In option assembly 109, pick mechanism 122 is mechanically coupled to drive mechanism 123 that is controlled by controller 103 via controller 118 and communication link 144. In both imaging device 102 and option assembly 109, pick mechanisms 122 are illustrated in a position to drive a topmost media sheet from the media stack M into media dam assembly 124 which directs the picked sheet into media path P or extension PX. Bottom feed media trays may also be used. As is known, media dam assembly 124 may or may not contain one or more separator rolls and/or separator strips used to prevent shingled feeding of media from media stack M. Feed roll assemblies 125, comprised of two opposed rolls—a driven roll under control of controllers 103 and/or 118 and an idler roll—feed media from an inferior unit to a superior unit via a slot provided therein.

In imaging device 102, a media path P (shown in dashed line) is provided from removable media input tray 121 extending through print engine 104 to media diverter system 200. Media path P may also have extensions PX (shown in dashed line) and/or branches PB (shown in dotted line) from or to other removable media input trays as described herein such as those shown in option assembly 109. Media path P may include a multipurpose input tray 126 provided on the housing of imaging device 102 or may be incorporated into removable media input tray 121 provided in imaging device 102 and a corresponding path branch PB that merges with the media path P within imaging device 102. Along media path P and its extensions PX are provided media position sensors 180-182 which are used to detect the position of the media, usually the leading and trailing edges of the media, as it moves along the media path P or path extension PX. Media position sensor 180 is located adjacent print engine 104 while media position sensors 181, 182 are positioned downstream from their respective media input tray 121 along media path P or path extension PX. Media position sensor 180 also accommodates media fed along path branch PB from multipurpose media tray 126. Media position sensor 182 is illustrated at a position on path extension PX downstream of removable media input tray 121 in option assembly 109. Additional media position sensors may be located throughout media path P and duplex path 131, when provided, and their positioning is a matter of design choice. Media position sensors 180-182 may be an optical interrupter, a limit switch or other type of edge detector as is known to a person of skill in the art used to detect the leading and trailing edges of each media sheet as it travels along the media path P, path branch PB, or path extension PX.

Media size sensors 183 are provided in image forming device 102 and each option assembly 109 to sense the size of media being fed from the removable media input trays 121. To determine media sizes such as Letter, A4, A6, Legal, etc., media size sensors 183 detect the location of adjustable trailing edge media supports and one or both adjustable media side edge media supports provided within removable media input trays 121 as is known in the art. Sensors 180-183 are shown in communication with controller 103 via communication link 145.

Media diverter system 200 is shown positioned on the media path P between an exit feed roll pair 135 and the plurality of destinations 600. Exit feed roll pair 135 is driven by motor 136 that is in operative communication with controller 103 via communication link 144 and provides a media sheet into the input 201 of media diverter system 200. Media diverter system 200 may be part of imaging device 102, may be part of finisher 604 or may be a stand-alone assembly as illustrated.

Figure 2:
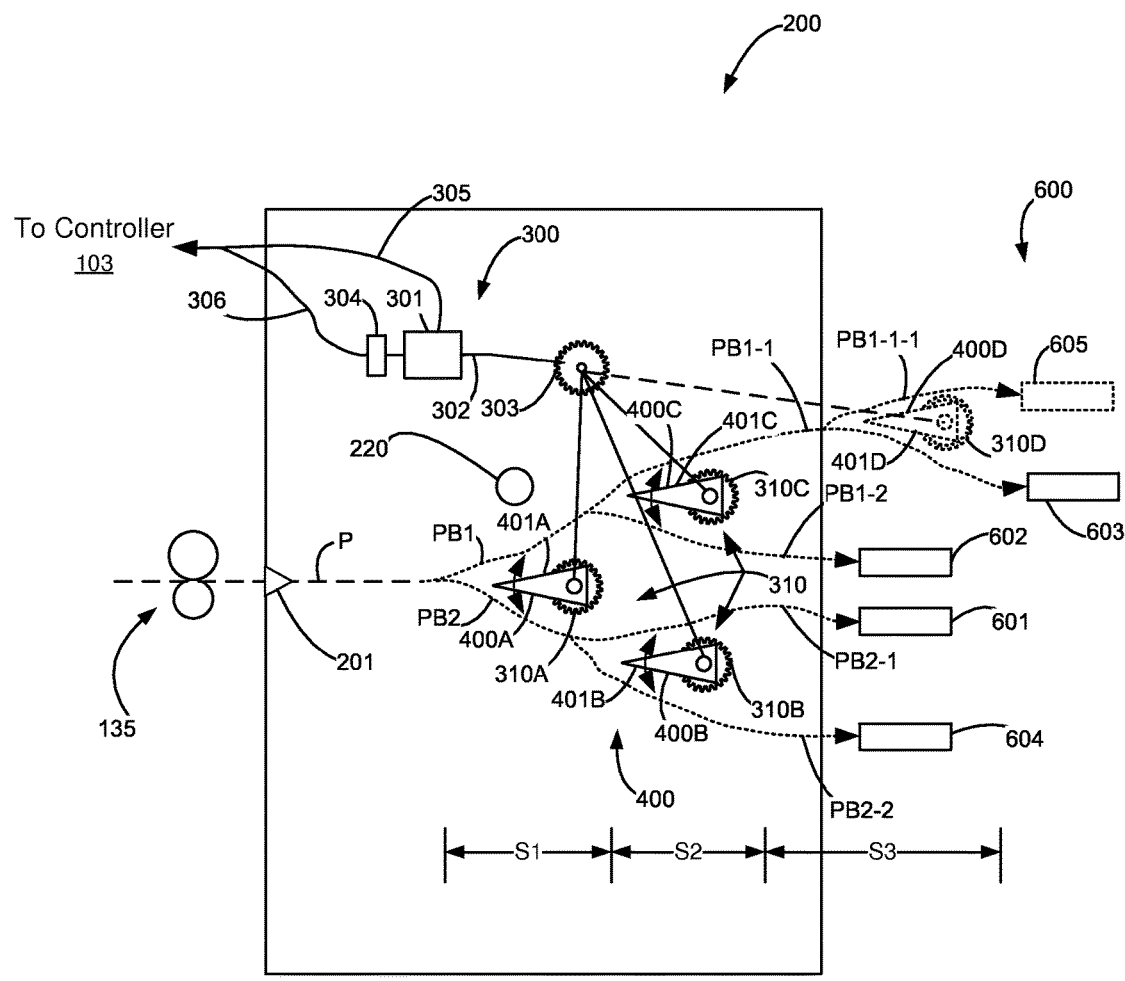
FIG. 2 is an enlarged schematic illustration of the media diverter system of FIG. 1.

Referring to FIGS. 1-2, media diverter system 200 includes a drive mechanism 300 coupled to a plurality of diverter assemblies 400 forming a plurality of path branches to the destinations 600. Four destinations are shown 601-604. Drive mechanism 300 includes a drive motor 301 having an output shaft 302 on which is mounted an output gear 303 that is operatively coupled to a plurality of drive gears 310. Drive gears 310A-310C are shown. The plurality of drive gears 310 are coupled to a respective plurality of gates 401 in the plurality of diverter assemblies 400. As shown, drive gears 310A-310C are coupled to gates 401A-401C, respectively. Each of the plurality of gates 401 has at least two positions for providing at least two media path output branches PB. The plurality of diverter assemblies 400 are arranged in stages in a tree branching configuration where the outputs of an upstream diverter assembly gate are directed either to the input of a downstream diverter assembly or to one of the plurality of destinations 600. Two stages S1, S2 are shown for purposes of illustration and not of limitation. In first stage S1 is diverter assembly 400A that receives the media sheet from input 201 and directs it to one of the inputs of second stage diverter assemblies 400B, 400C, respectively, positioned downstream along path branches PB1, PB2 respectively. Second stage diverter assembly 400B directs media from path branch PB2 along media path branch PB2-1 to standard output bin 601 which may be the default destination or along media path branch PB2-2 to finisher 604. Second stage diverter assembly 400C directs the media from media path branch PB1 along media path branch PB1-1 to mailbox 603 or along media path branch PB1-2 to mailbox 602. As shown, a binary branching scheme is used with the diverter assemblies 400A-400C and at least four output destinations 600 are provided.

Additional stages S3 may be provided downstream of the second stage S2 at one or both of second stage diverter assembly 400B, 400C. For example, an optional third stage diverter 400D is illustrated downstream of diverter assembly 400C along a media path branch PB1-1 providing optional path branch PB1-1-1 to an additional output destination 605. As each additional diverter assembly 400, which is a two output unit, is added along a media path branch PB in media diverter system 200, one additional media path branch is added. The number of output destinations 600 are based on a number of positions provided for gates 401 and on the configuration of each drive gear 310 as will be detailed below.

Advantageously, the plurality of drive gears 310 are all rotated by a single drive motor 301 via output gear 303. A control signal 305 from controller 103 to drive motor 301, which in one form is a DC stepper motor, controls the angular rotation and direction of output gear 303. A predetermined amount of rotation of each drive gear 310 associated with each gate 401 opens a particular media path branch PB leading to a desired one of output destinations 600, as will be detailed in the following figures. For example, as output gear 303 rotates, drive gears 310A-310C are rotated so that input 201 of media diverter system 200 is connected to one of the output destinations 601-604. In one form, an encoder 304 may be provided on output shaft 302 of drive motor 301 to provide an output signal 306 to controller 103 to control output shaft position of drive motor 301.

A home position sensor 220 is provided in the media diverter system 200. Home position sensor 220, in communication with controller 103 via communication link 144, is used to determine the home or default position for diverter assemblies 400. For example, a default media path may be from input 201 through path branches PB2, PB2-1 to output destination 601 that is standard output bin 601 of imaging device 102.

Figure 3:
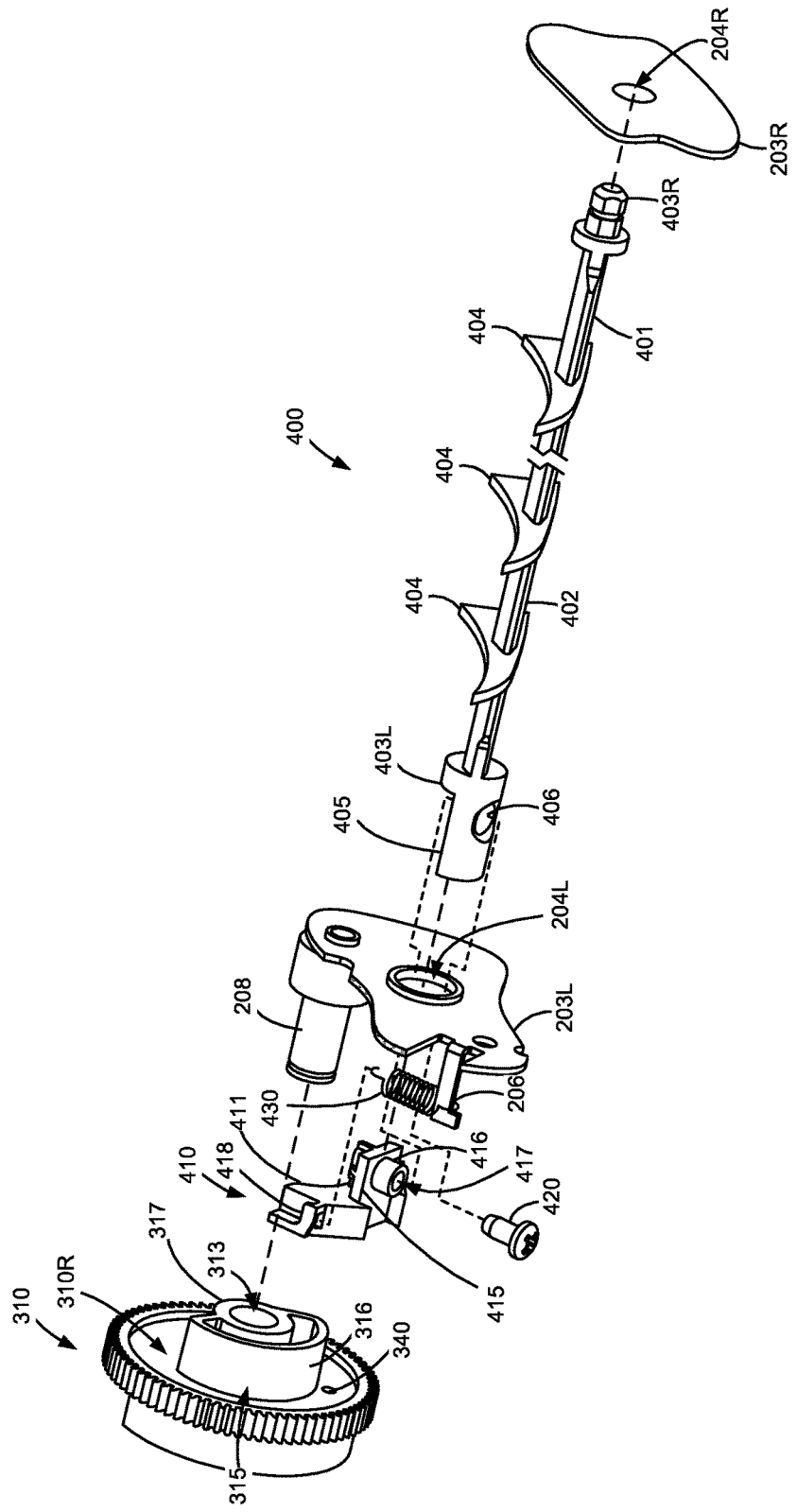
FIG. 3 is an exploded view of a diverter assembly used in the media diverter system of FIG. 4.
Figure 4:
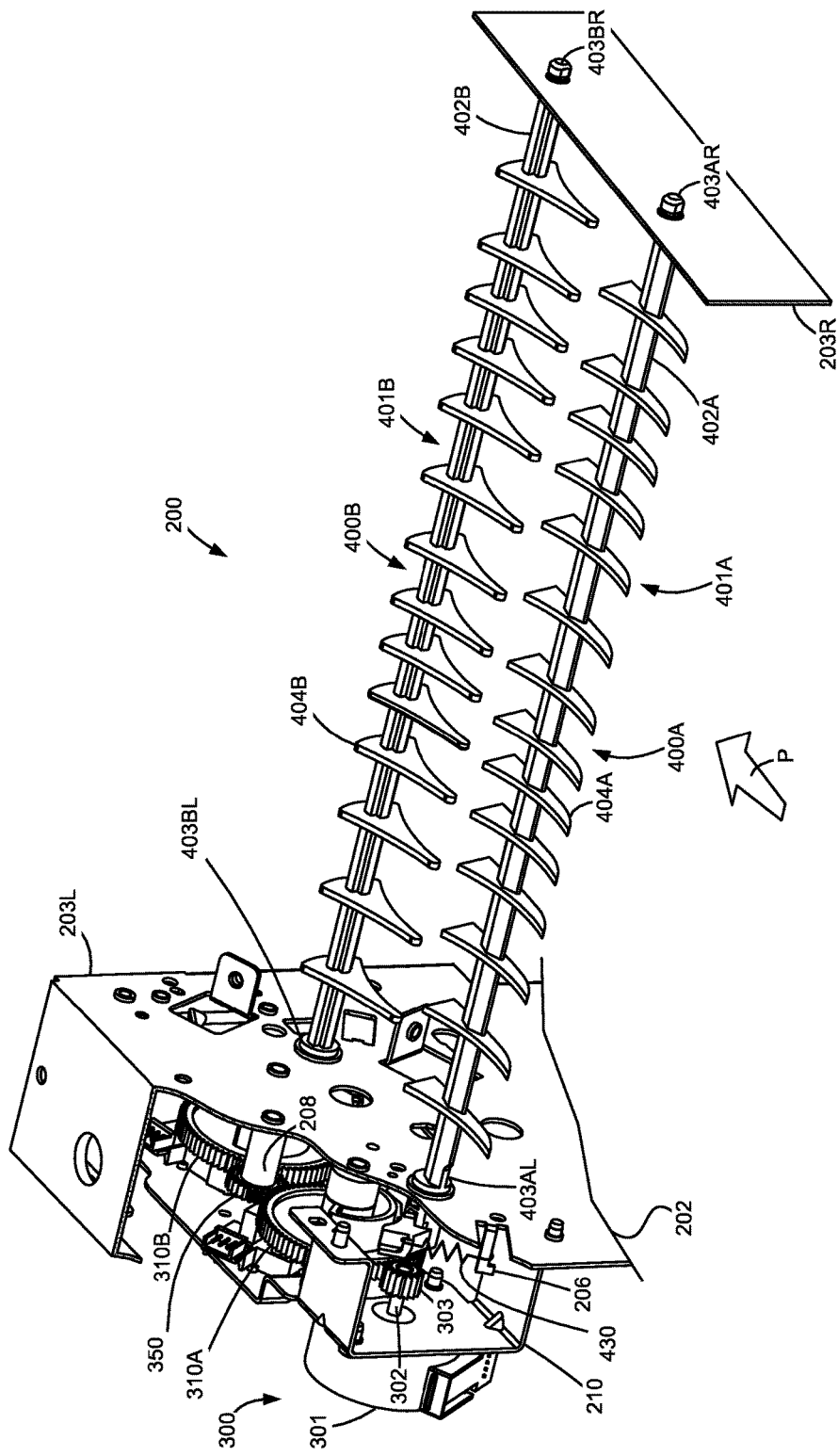
FIG. 4 illustrates a side perspective view of a media diverter system having two diverter assemblies.

Referring now to FIGS. 3-4, the structure of the diverter assemblies 400 of media diverter system 200 will be described. FIG. 3 illustrates a general diverter assembly 400. FIG. 4 shows a side perspective view of an example media diverter system 200 having only two of the three diverter assemblies, 400A, 400B, shown for purposes of clarity. Diverter assembly 400C has been removed and would be mounted above diverter assemblies 400A, 400B (see FIG. 8A). In FIG. 4 diverter assemblies 400A-400B are substantially the same in construction and in operation as general diverter assembly 400 unless otherwise noted. Diverter assemblies 400A-400B will carry similar reference numerals to general diverter assembly 400. Gates 401A-401B and pivot arms 410A-410B will carry similar reference numerals to gate 401 and pivot arm 410, respectively. As will be used in this description, the terms top, bottom, front, and rear of media diverter system 200 refer to the orientation illustrated in FIG. 4.

Referring to FIG. 3, a general diverter assembly 400 including a gate 401 and pivot arm 410 is shown in an exploded view. Gate 401 includes a shaft 402 rotatably mountable between left and right side panels 203L, 203R of frame 202 of media diverter system 200 (see FIG. 4). Each shaft 402 has a plurality of ribs 404 spaced along its length that serve as media deflectors used to guide a media sheet into one of the media path branches depending on the position of gate 401. As shown, ribs 404 have a triangular profile. Other types of rib profiles may be used to deflect a media sheet from one location to another along media path P and/or media path branches PB. Left and right end portions 403L, 403R of shaft 402 are rotatably supported in respective and appropriately-sized holes 204L, 204R, respectively, in left and right side panels 203L, 203R, respectively, of frame 202. Left end portion 403L includes a collar 405 having a semi-cylindrical shape axially aligned with shaft 402 that is inserted through hole 204L. An opening 406 is provided in collar 405.

Pivot arm 410 is attached to collar 405. A tab 415 extends from pivot arm 410 and a mounting boss 416 is provided on tab 415. Mounting boss 416 includes an opening 417 and is received in opening 406 of collar 405. A fastener 420 is received in opening 417 and is used to attach pivot arm 410 to collar 405. Other methods of coupling pivot arm 410 to shaft 402 may be used and the illustrated attachment should not be considered as limiting. A biasing member 430, such as coil spring 430, is attached between left side panel 203L and the first end 411 of pivot arm 410. As shown, a tab 206 projects from left side panel 203L and a catch 418 is provided on the first end 411 of pivot arm 410. Biasing member 430 is attached to tab 206 and catch 418.

Pivot arm 410 engages with drive gear 310 that is rotatably mounted to a post 208 projecting from left side panel 203L via a center opening 313 that is provided in drive gear 310 for this purpose. Provided on a rear face 310R of drive gear 310 is a lobe 315 having at least two camming surfaces—an up camming surface 316 and a down or dwell camming surface 317. The second end 412 (see FIG. 6) of pivot arm 410 rides on camming surfaces 316, 317 during the rotation of drive gear 310. Drive gear 310 also includes an alignment mark 340.

Figure 8A:
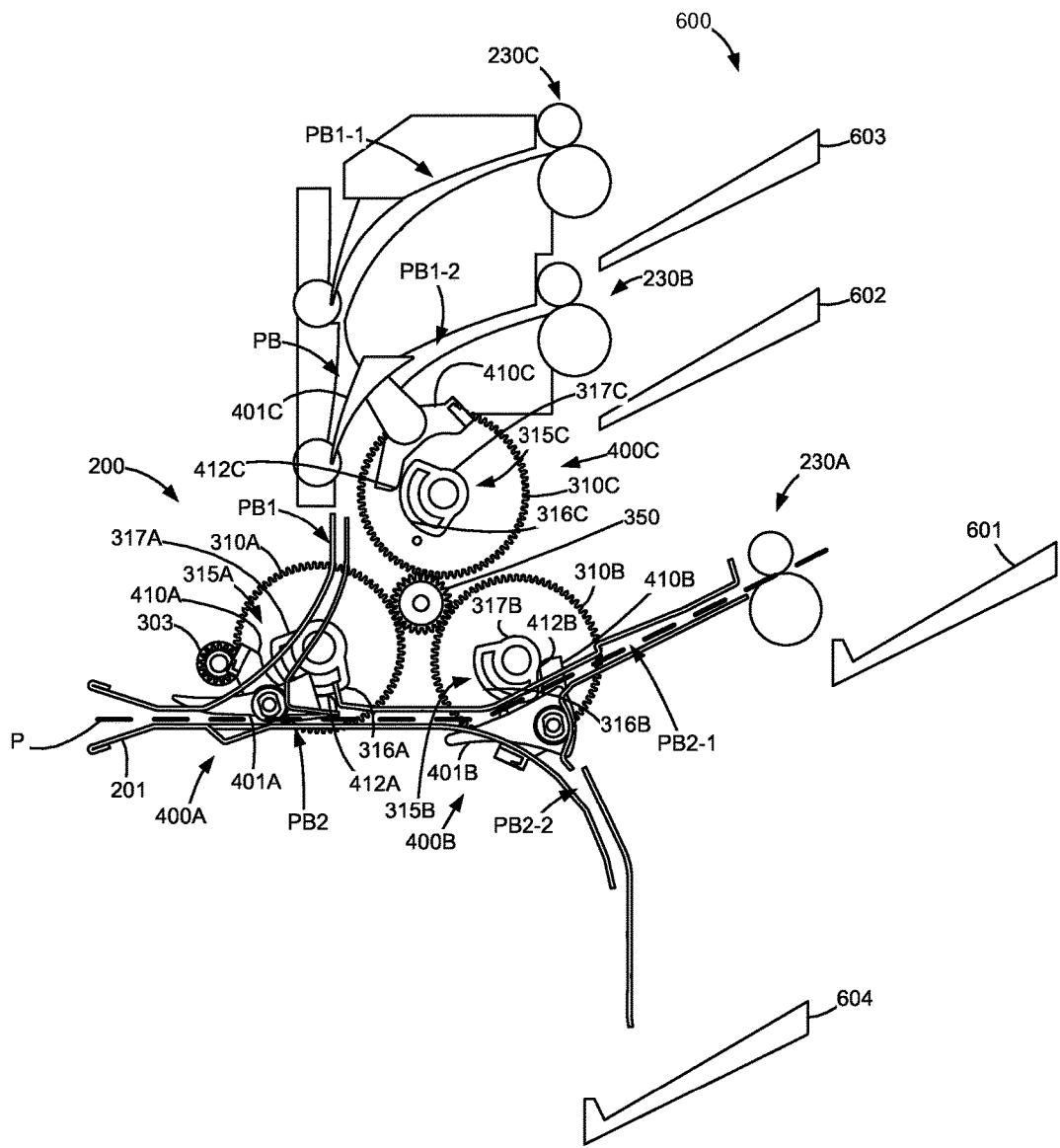
FIGS. 8A-8D show example rotational orientations of media diverter assemblies according to an example embodiment of the present disclosure illustrating the connection between the input of the media diverter system to a predetermined one of four output destinations.
Figure 12A:
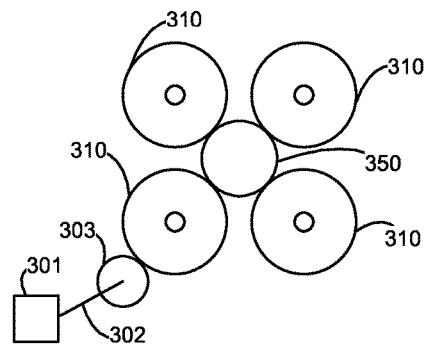
FIGS. 12A-12B show a four diverter assembly system where FIG. 12A uses an idler gear coupled with each of the diverter assemblies and FIG. 12B shows a motor driven gear coupled to each of the diverter assemblies.

As shown in FIG. 4, drive mechanism 300 is mounted on a left side panel 203L of frame 202. A mounting plate 210 is attached to left side panel 203L on which drive motor 301 is mounted. Output gear 303 of drive motor 301, such as a pinion gear 303, is mounted on motor output shaft 302 and is coupled to drive gear 310A that in turn is coupled to drive gear 310B via an idler gear 350 mounted on a post 208 on left side panel 203L. Drive gear 310C that is engaged with pivot arm 410C of diverter assembly 400C would also be coupled to idler gear 350 as shown in FIG. 8A or 12A, for example. While output gear 303 is shown to be rotatably coupled to a drive gear 310A, output gear 303 may replace idler gear 350 and be directly coupled to all three drive gears 310A-310C or, keeping idler gear 350 in place, to one of the other drive gears 310B, 310C. Idler gear 350 is coupled to all three drive gears 310A-310C allowing synchronous or simultaneous rotation of the three drive gears 310A-310C in the same direction. In another aspect, an idler gear 350 may be provided for each pair of drive gears 310 in the media diverter system 200(see FIGS. 11A-11E). Drive motor 301 may be reversible, allowing drive gears 310A-310C to be simultaneously rotated in one of a forward or a reverse direction. Drive gear 310A is coupled to shaft 402A of gate 401A and drive gear 310B is coupled to shaft 402B of gate 401B. The left and right ends 403AL, 403AR of shaft 402A are rotatably mounted to left and right panels 203L, 203R, respectively. The left and right ends 403BL, 403BR of shaft 402B are rotatably mounted to left and right panels 203L, 203R, respectively. Shafts 402A, 402B have a plurality of deflector members 404A, 404B mounted thereon along their respective axial lengths.

FIGS. 5A-5B show front and rear views of drive gear 310, respectively. FIG. 6 shows a side perspective view of a pivot arm 410. In FIG. 5A, the front face or surface 310F of drive gear 310 may include a home position indicator or flag rib 330 encompassing a sector of the circumference of the drive gear 310. The flag rib 300 is illustrated as axially extending from the front face 310F. Flag rib 330 actuates the home position sensor 220, such as an optical interrupter type sensor 220 shown in FIG. 10. An alignment mark or alignment opening 340 is also provided on drive gear 310. A gap 331 of a predetermined length is provided in flag rib 330. When gap 331 rotates into home position sensor 220, an output signal 221 is in a first state 221-1, and when flag rib 330 is present in home position sensor 220, the output signal 221 is in a second state 221-2 (See FIG. 10). When driving drive gear 310 in reverse direction, flag rib 330 and gap 331 indicate a home position, as will be discussed in detail below in connection with FIG. 10. As is known in the art there are many ways to determine the home position of a component and use of an optical sensor is shown for purposes of description and not limitation In FIG. 5B, the rear face 310R of drive gear 310 includes at least one axially-extending lobe 315 providing up camming surface 316 and down or dwell camming surface 317 on which the second end 412 of pivot arm 410 rides. When the second end 412 of pivot arm 410 is on the up camming surface 316, gate 401 is said to be in a first or up position (see FIG. 7A) and when on the down or dwell camming surface 317, gate 401 is said to be in a second or down position (see FIG. 7B). Up camming surface 316 has a generally curved or arcuate shape, and as illustrated, down camming surface 317 is slightly curved or bowed and may be viewed as having first, center and second end portions 318, 319, 320, respectively. Down camming surface 317 may be generally planar (for example, see FIG. 11A). However, down camming surface may also have a curved profile. Center portion 319 is shown as curved but its radius is not large enough to cause the gate 401 to move from its down position when the second end 412 of pivot arm 410 traverses across down camming surface 317. Camming surfaces 316, 317 are traversed by pivot arm 410 during one revolution of drive gear 310. As will be recognized, the amount of time during a given rotation of drive gear 310 that gate 401 is in the first and second positions corresponds to the amount of time that the second end 412 of pivot arm 410 rides on the respective up and dwell camming surfaces 316, 317. Biasing member 430 ensures that gate 401 returns to the second or down position when the second end 412 of pivot arm 410 rides on down or dwell camming surface 317.

On lobe 315 of drive gear 310, camming surfaces 316, 317 have differently shaped profiles for moving and holding gate 401 at a first (up) position or at a second (down) position, respectively. For example, as second end 412 of pivot arm 410 rides along down camming surface 317, first and second end portions 318, 320 serve as transitional surfaces to more smoothly effect the transition of the second end 412 of pivot arm 410 in its movement between the two camming surfaces of drive gear 310, and, in moving gate 401 between the first and the second positions. First and second end portions 318, 320 of down camming surface 317 are depicted as inclined surfaces. Additionally, while lobe 315 is illustrated as projecting from the rear face 310R of drive gear 310 (see FIG. 3), lobe 315 may be a separate member from drive gear 310 that attaches to drive gear 310.

Respective lengths of camming surfaces 316, 317 of the lobe 315 of the drive gear 310 are predetermined based on a total number of drive gears in the media diverter system 200. Presuming, for example, that there is only one lobe for each drive gear, a sectoral arc length of up camming surface 316 is substantially equal to a full rotation of the drive gear divided by the total number of drive gears involved in the media diverter system 200. As illustrated in FIG. 8A, where three drive gears 310A-310C are coupled to idler gear 350, the sectoral arc length of up camming surfaces 316A-316C represents about 33 percent or about 120 degrees of a single revolution of each respective drive gear 310A, 310B, 310C, while the sectoral arc length of down camming surfaces 317A-317C represents about 67 percent or 240 degrees. In other aspects, an arc length for the up camming surface 316 may be determined by dividing a full rotation of a drive gear (i.e., 360 degrees) with the total number of drive gears in the media diverter assembly 200. Since at least two drive gears 310 may be rotating simultaneously in the same amount via coupling of idler gear 350, an arc length of the up camming surface dictates when the corresponding gate 401 moves into the second or up position for directing a media sheet to a downstream diverter assembly or output destination. Other sectoral arc lengths for both camming surfaces may be used and those illustrated should not be considered as limiting. For example, should four diverter assemblies be provided as shown in FIG. 2, the up and down camming surfaces would have arc lengths of about 90 degrees and about 270 degrees, respectively. The "up" position and "down" position add up to 360 degrees. At some point in the rotation of each drive gear, a mechanical threshold will be reached, and the corresponding gate will transition from an up position to a down position or vice versa. This is very similar to the rise/fall time of an electrical signal. The period of the mechanical signal equals 360 degrees and is the total of up, down and rise and fall transitions therebetween. The transition of each gate is not instantaneous either in time or position. This matters as the number of gates N increases and that all N gates must transition between their respective first and second positions (up and down positions) within a single rotation of 360 degrees. For example, if it takes 10 degrees of rotation to change the position of a gate, then for N=4 that requires 80 degrees out of the total 360 degrees of rotation to be used for overhead to allow for the rise and fall of the gate when transitioning between its two positions. While the foregoing examples show the use camming surfaces having the same arcuate lengths of rotation, the media diverter system may be designed so that access to a default path, such as the media path to the standard output bin 601, uses 180 degrees of the rotation of the drive gears while the remainder of their rotation may be divided up into smaller rotational increments, for example 20 to 30 degree increments, for the operation of the other diverter assemblies in the system.

In another aspect, an increased number of lobes 315 may be provided on drive gear 310 allowing for an increase in the rate at which the gate 401 changes between the first and second positions, and thereby opening and closing the respective media path branches PB at a rate higher than when a fewer number of lobes are present. For example, a single drive gear may have a lobe including a plurality of up and down camming surfaces 316, 317, respectively (see FIGS. 13A-13B). In a further aspect, a drive gear 310 may have a shaft axially extending from a center portion thereof to which a plurality of lobes 315 may be disposed, such as that shown in FIG. 14. In this aspect, each lobe 315 engages with a pivot arm 410 of a corresponding gate such that a single rotation of a drive gear will move multiple gates and open multiple media path branches.

As shown in FIG. 6, each pivot arm 410 has a first end 411 and a second end 412. Second end 412 contacts camming surfaces 316, 317. Second end 412 may be rounded as shown or angled. The second end 412 of pivot arm 410 is in continuous contact with camming surfaces 316, 317 of lobe 315 as it rotates. While pivot arm 410 is shown as a component separate from gate 401 in FIG. 3, second end portion 403L of shaft 402 may be molded to include pivot arm 410. Hole 204L would be suitably modified to allow for this. For example, an open-ended slot may be provided along with an end member that would be attached to close off the open end of the slot after shaft 402 is in place. Pivot arm 410 acts as a cam follower. Pivotal movement of gate 401 is based on the contact of pivot arm 410 with camming surfaces 316, 317 as shown in FIGS. 7A-7B.

Figure 7A:
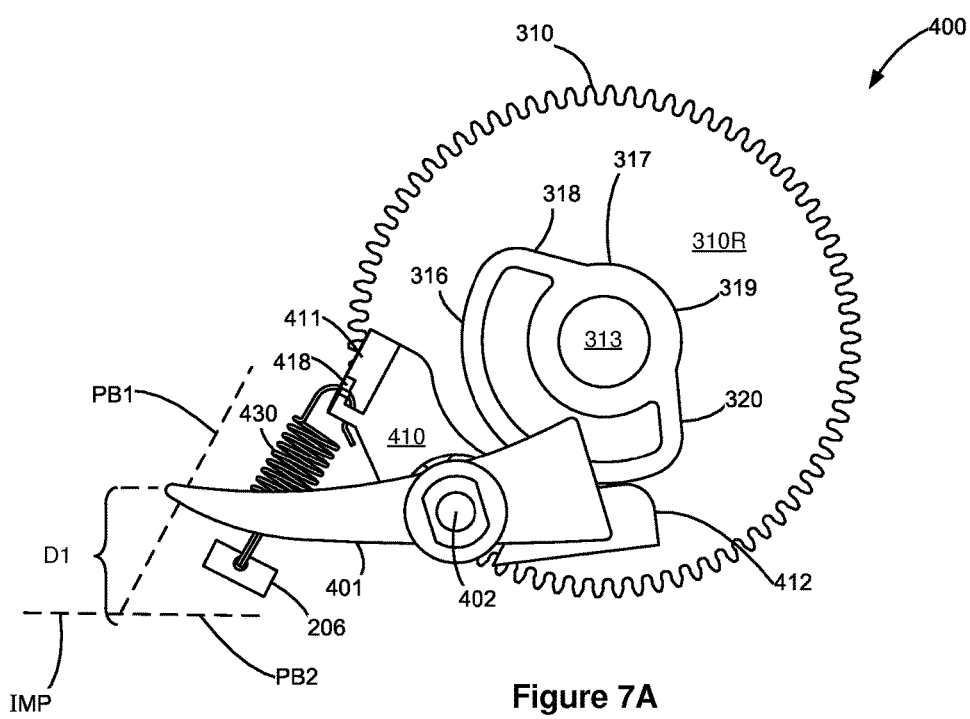
FIGS. 7A-7B show the interaction of the drive gear and the pivot arm for moving the attached gate between a first position—opening a first media path branch—and a second position—opening a second media path branch.
Figure 7B:
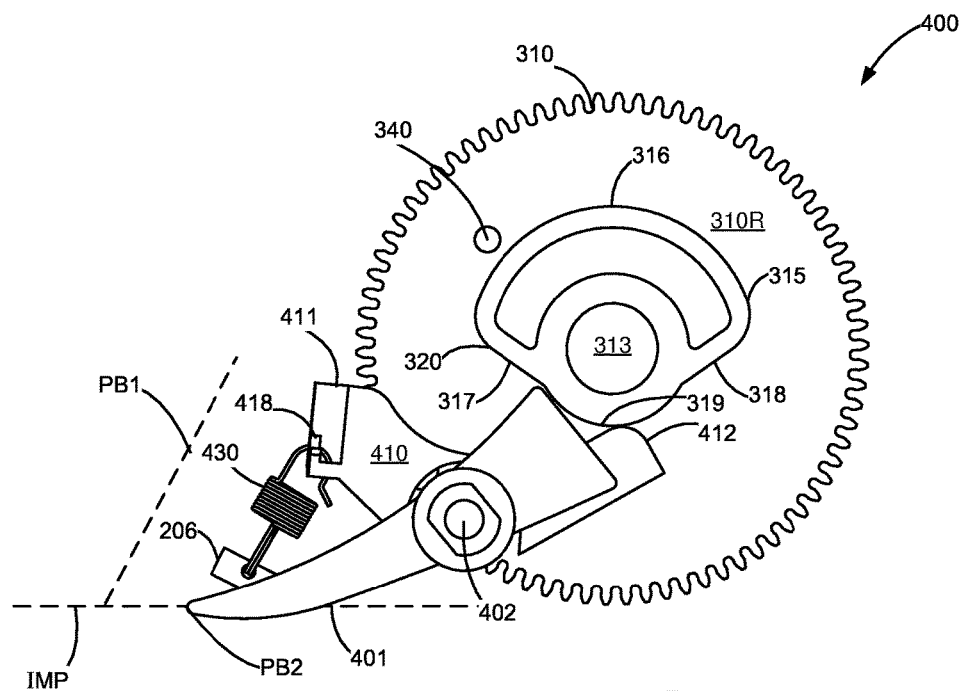

FIGS. 7A and 7B show the interaction between drive gear 310 and pivot arm 410 as the gate 401 of diverter assembly 400 pivots between the first and second positions. In FIG. 7A, gate 401 is raised a first distance D1 from input media path IMP into the first position (or up position) where input media path IMP is open to output path branch PB2 and path branch PB1 is blocked. Second end 412 of pivot arm 410 is riding on up camming surface 316 and biasing member 430 is extended. In FIG. 7B, the second end 412 of pivot arm 410 has transitioned onto down camming surface 317 and gate 401 is lowered back to the second position at or slightly below input media path IMP. Path branch PB1 and input media path IMP are in communication while branch PB2 is blocked. Biasing member 430 has returned to a contracted position. In general, whether or not gate 401 is being moved in a first or a second position depends on which of the camming surfaces 316, 317 the second end 412 of pivot arm 410 contacts.

FIGS. 8A-8D illustrate how a media sheet is directed to one of the predetermined output destinations 601-604 in media diverter system 200. Three media diverter assemblies 400A-400C, with gates 401A-401C having pivot arms 410A-410C, respectively, are shown. Diverter assemblies 400A-400C are depicted in side view thereon for purposes of clarity. Drive gears 310A-310C have lobes 315A-315C, respectively. Each of the lobes 315A-315C is positioned on media diverter system 200 to a predetermined initial angular orientation using alignment mark 340 (see FIG. 9). The second ends 412A-412C of pivot arms 410A-410C are engaged with lobes 315A-315C, respectively. Drive gears 310A-310C are engaged with idler gear 350. Output gear 303 is coupled to drive gear 310A.

The media diverter system illustrated in FIGS. 8A-8D is based on the concept that straightest path through the media diverter system 200 was architected as the heaviest use path and chosen as the default path and once chosen determines the default home positions for the combination of diverter gates used. Ideally, the initial path architecture can be arranged such that the default path is rather short so the job arrives quickly, has the least number of path bends for high feed reliability, and requires the least amount of handling to move sheets from input to output. Handling, in this context, refers specifically to passing through diverter gates without a required motor driven change to the at-rest position of the gates. With multiple output paths, one path will typically be more optimal compared to the others. With all these advantages, that same path is the logical choice for the home or default path. Here it would be to standard output bin 601.

In a similar manner, there may be a hierarchy among the remaining output paths from higher use to lower use. The same architectural criteria would apply. If possible, the shorter, straighter paths with the fewest diverter gate changes from default should have heavier use and the longer, multiple-bend pathways requiring multiple diverter gate actuations the least.

With regard to the diverter gates, each gate has at least two states, and there is an advantage to choosing the lower energy position as the default state for each gate when possible. The lower energy state is one where the return spring imparts the least force to the gate arm. Since the diverter gates are typically plastic, less force on the gate arm means the plastic material will undergo less long-term plastic deformation due to plastic creep. When the paths and gates can be arranged such that more diverter arms are in the down position for home (default), the gates will spend considerably less time in the higher load condition. Such considerations may help to increase reliability and provide longer life for the media diverter system 200.

Diverter assembly 400A receives a media sheet from input 201 on media path P and directs the media sheet to either media path branch PB1 or media path branch PB2 leading to downstream or second stage diverter assemblies 400C, 400B, respectively. Diverter assembly 400C receives a media sheet from media path branch PB1 and directs this to either media path branch PB1-1 or media path branch PB1-2 leading to mailbox bins 603 or 602, respectively. Diverter assembly 400B receives a media sheet from media path branch PB2 and directs this to either of media path branch PB2-1 or media path branch PB2-2 leading to standard output bin 601 and finisher 604, respectively. Optional exit rolls 230A, 230B, 230C on media path branches PB2-1, PB1-2, PB1-1, respectively, may be provided to assist with movement of the media sheet to output destinations 601-603, respectively.

FIG. 8A shows an example home or default position for media diverter system 200 where input 201 is connected to standard output bin 601 via path branches PB2, PB2-1. Gate 401A is in the up position where pivot arm 410A is on up camming surface 316A of lobe 315A and gate 401B is in the down position and pivot arm 410B is on down camming surface 317B of lobe 315B. Gate 401C is shown in the up position where pivot arm 410C is on up camming surface 316C of lobe 315C. The designation and location of standard output bin 601 as well as the other output destinations 602-604 and the positioning of gates 401A-401C is a matter of design choice and the illustrated arrangement and positioning should not be considered as limiting. When media diverter system 200 is in the home position, drive motor 301 does not need to be driven for a media sheet in order for a media sheet to be sent to standard output bin 601.

Figure 8B:
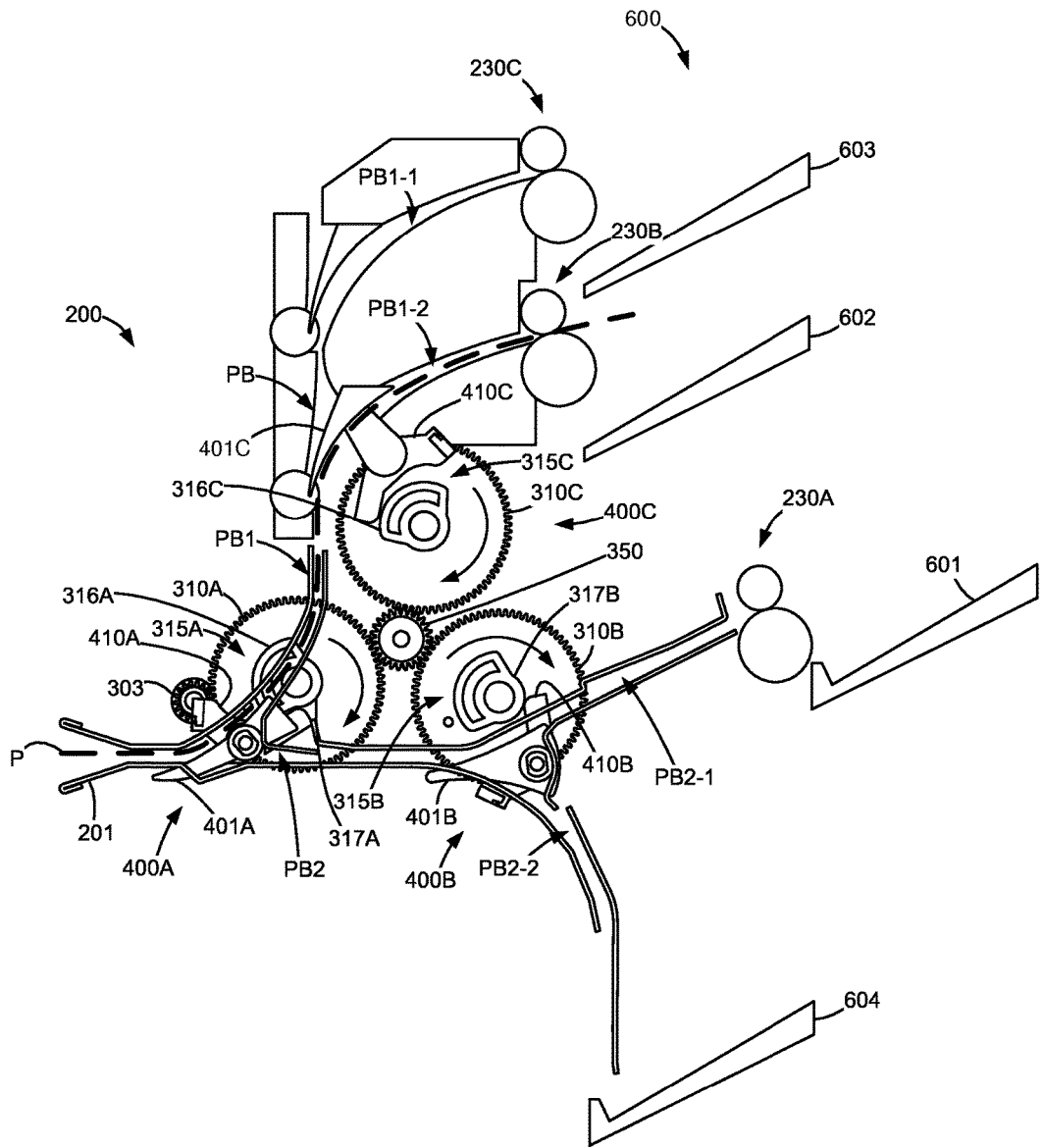
Figure 8C:
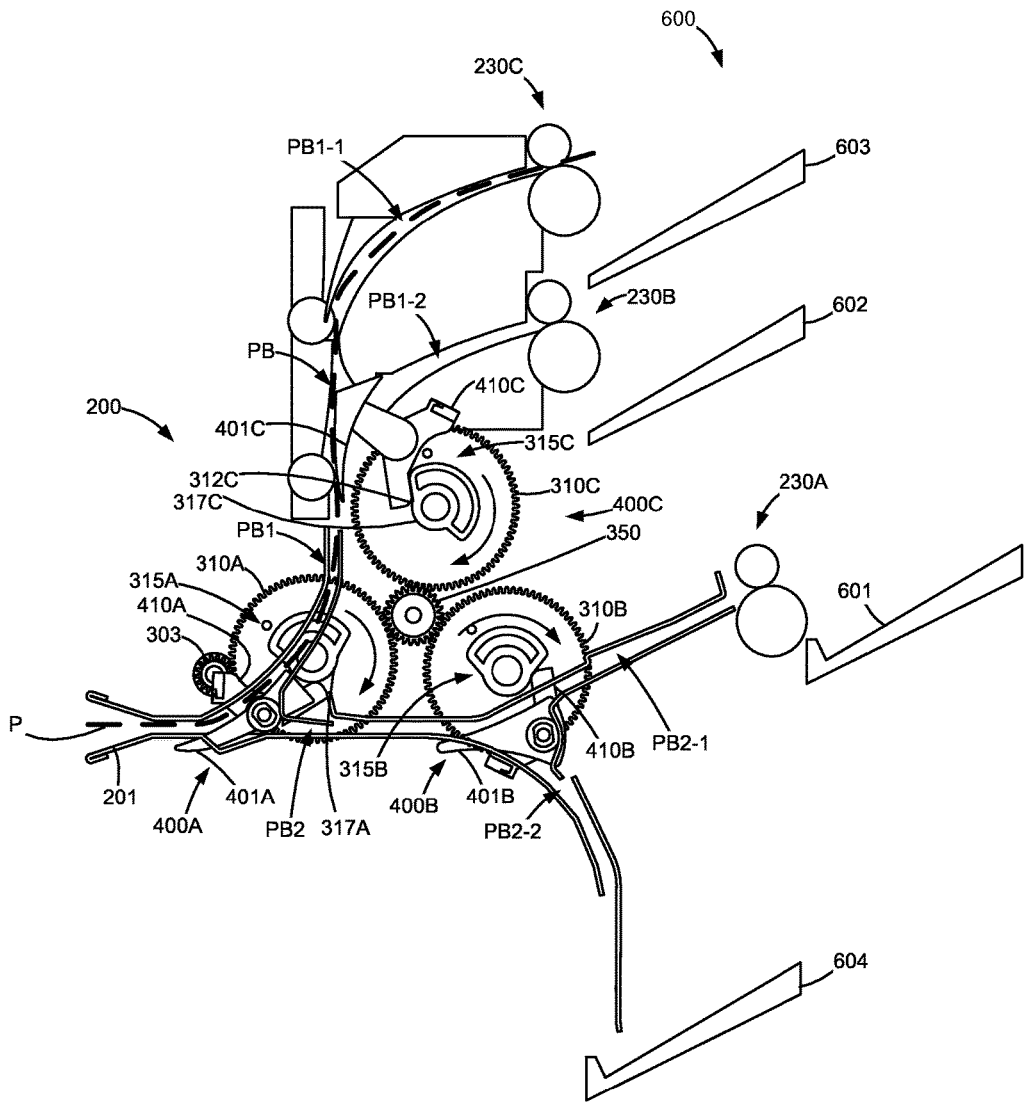
Figure 8D:
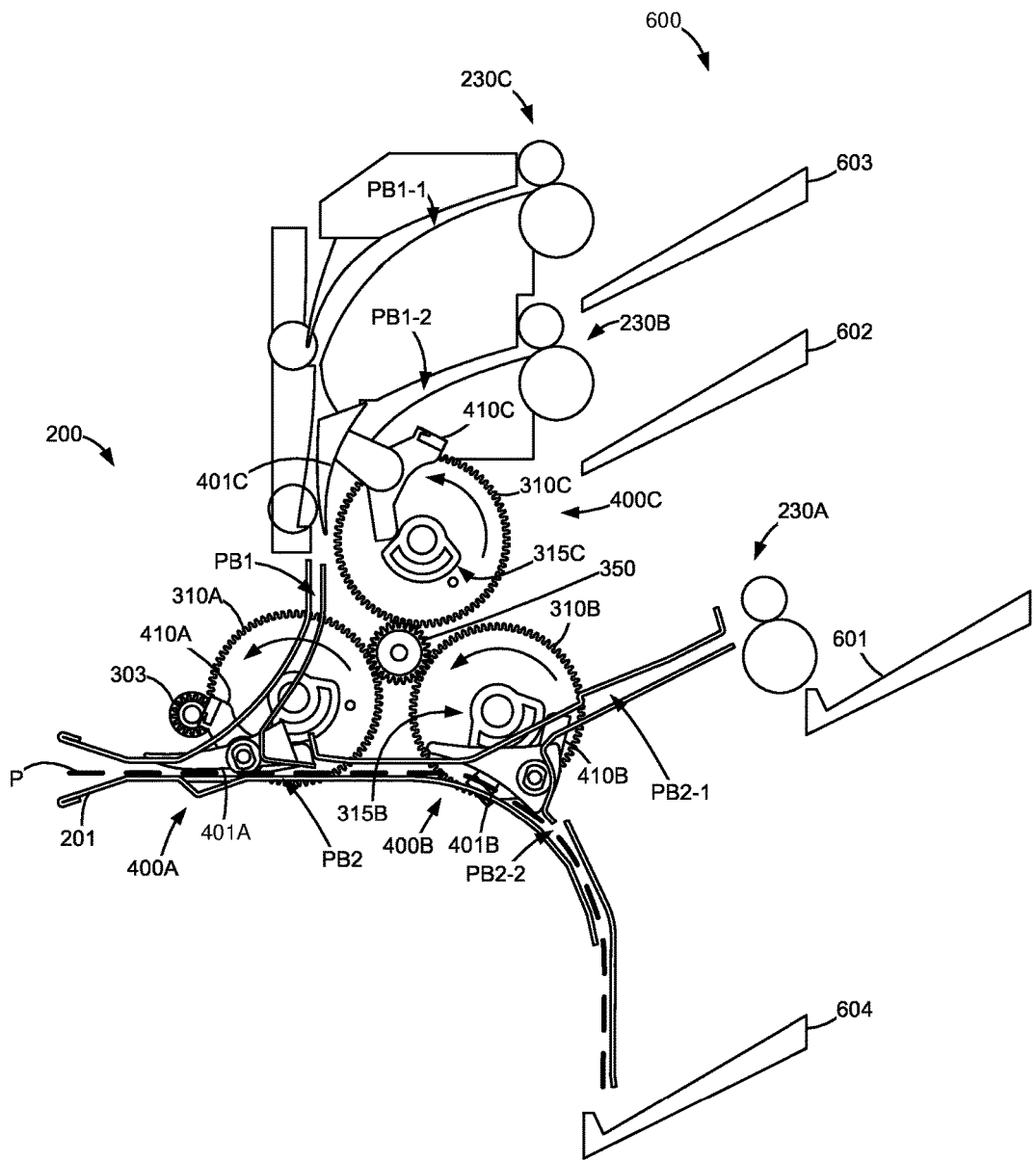

FIGS. 8B-8D illustrate how a media sheet may be directed to output destinations other than the default or standard output bin 601 based on the amount of rotation provided by drive motor 301. Prior to activating media diverter system 200, controller 103 determines an appropriate output destination 600 for a media sheet. In the context of imaging device 102, the appropriate destination from destinations 602-604 is based on user inputs detected by controller 103 from user interface 107 or from computer 150. Using the user interface 107 or computer 150, a user is able to enter one or more preferences in performing imaging operations on imaging device 102 which includes, for example, whether or not finishing operations (e.g., stapling, hole punching, etc.) are to be performed on a media sheet/s after printing. If a particular output destination for a printed media sheet M has not been specified by the user or no finishing operations are specified by the user to be performed on a printed media sheet, media diverter system 200 directs the printed media sheet to a default destination such as standard output bin 601. Otherwise, media sheets are directed to the specified destination. For example, media to be stapled would be directed to finisher 604.

In FIGS. 8B-8D, an amount and direction of rotation made to the drive gears 310A-310C is based from the home position of the same drive gears as depicted in FIG. 8A. Upon determination by controller 103 that a media sheet is to be outputted to one of mailbox bins 602, 603, or finisher 604, drive motor 301 is activated to rotate output gear 303 a predetermined rotational amount. After a media sheet has been delivered to its predetermined destination, the drive gears 310A-310C are returned to their home positions depicted in FIG. 8A either by rotating them in the reverse direction or by continuing their rotation in the same direction that was initially used to direct the media sheet to the desired destination.

FIG. 8B illustrates the media path leading to destination 602, which is a mailbox bin 602. When a media sheet is identified to be transported to mailbox bin 602, a drive signal is sent by controller 103 to drive motor 301 to rotate output gear 303 anticlockwise rotating drive gear 310A directly coupled to output gear 303 to move in a clockwise direction at about 70 degrees relative to the home position of drive gear 310A. Drive gears 310B, 310C rotate the same amount in the same direction via idler gear 350. As drive gear 310A is rotated, pivot arm 410A transitions from up camming surface 316A onto down or dwell camming surface 317A on lobe 315A. Gate 401A is translated into the second position, thereby opening media path branch PB1 and blocking media path branch PB2. Gate 401C remains in the first position as pivot arm 410C rides along up camming surface 316C of lobe 315C, media path branch PB1-2 is opened. Thus, a media sheet is being directed from input 201 to mailbox bin 602 through media path branches PB1 and PB1-2.

Similarly, as shown in FIG. 8C, when a media sheet is identified to be transported to mailbox bin 603, controller 103 drives drive motor 301 to rotate output gear 303 anticlockwise such that, drive gears 310A-310C via idler gear 350 are rotated clockwise about 140 degrees from their respective home positions in FIG. 8A to the positions shown in FIG. 8C. Such rotation causes both gates 401A and 401B to be oriented at respective second (down) positions with pivots arms 410A, 410C riding on respective down camming surfaces 417A, 417C. This opens media path branches leading to mailbox bin 603, specifically, media path branches PB1 and PB1-1, from input 201 on media path P.

In the case of outputting media sheets to finisher 604 as shown in FIG. 8D, controller 103 drives drive motor 301 to rotate output gear 303 clockwise rotating drive gears 310A-310C about 70 degrees anticlockwise such that both gates 401A and 401B are moved into respective first (up) positions blocking path branches PB1, PB2-1, respectively, allowing a media sheet to move from input 201 through media path branches PB2 and PB2-2 to finisher 604. In another aspect, controller 103 may drive motor 301 to rotate output gear 303 anticlockwise to rotate drive gears 310A-310C at about 290 degrees clockwise such that both gates 401A and 401B are in the positions shown in FIG. 8D. The preceding assumes that the gearing has a 1:1 ratio. Different gearing ratios may be used, but when used, the gate activation direction would need to be consistent and then reversed to realign in the home position. Dependent on the system design, different gearing ratios may be used to provide more torque or a change in the speed at which a gate transitions between its positions.

Returning each drive gear 310A-310C to their respective home positions may include determining, by controller 103, a current rotational position of each drive gear and rotating each drive gear until a home position has been reached based on a preset indicator. At least one of drive gears 310A-310C on media diverter system 200 may be provided with a home position marker or indicator thereon (e.g., flag rib 330) for engaging with home position sensor 220. In one example embodiment shown in FIG. 10 as well as in FIG. 5A, home position marker or indicator 330 is shown as a circumferential flag rib axially extending from the front face 310F of drive gear 310. Flag rib 330 has gap 331 that serves as a home position indicator for drive gear 310. Because all the drive gears move in a synchronous manner via coupling with idler gear 350, when one drive gear, such as drive gear 310A, returns to the home position, the remaining drive gears, drive gears 310B, 310C, also return to their respective home positions. Similarly, all gates 401, such as gates 401A-401C, as shown also return to their home positions.

Figure 9:
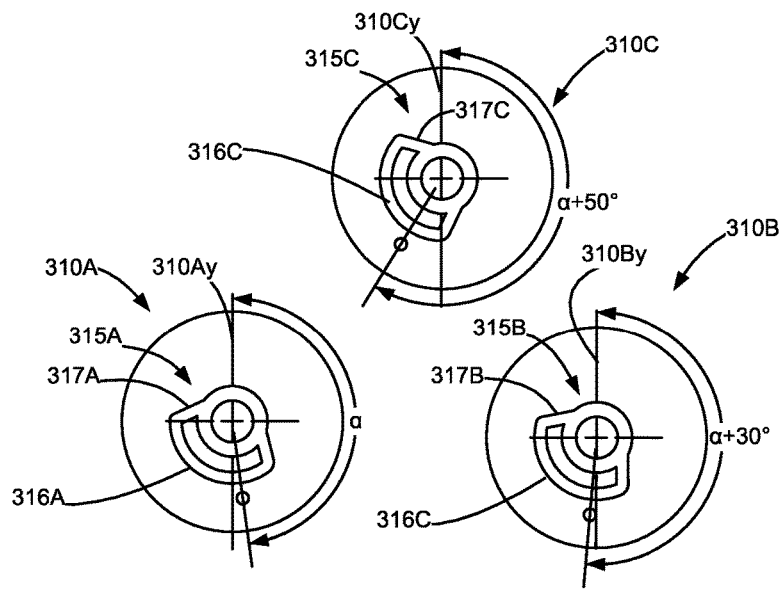
FIG. 9 schematically depicts respective initial angular orientations of the drive gears of the media diverter assemblies relative to each other as shown in FIG. 8A.

Referring to FIG. 9, the home or default positions for lobes 315A-315C are shown for the media path to destination 601. In the present disclosure, configuring drive gears 310A-310C in the home position is based on the angular positions of their respective alignment marks 340A-340C from a positive vertical axis depicted as lines 310Ay, 310By, and 310Cy, respectively. For drive gear 310A, lobe 315A is positioned at an angle α relative to line 310Ay. Lobes 315B, 315C are positioned at about 30 and 50 degrees more than angle α, respectively, each being relative from their respective lines 310By and 310Cy. These angular positions are example positions, and the angular positions including the positioning of the various output destinations 600 are a matter of design choice. In FIG. 8A, gate 401A is in the first position opening media path branch PB2 to gate 401B, which is in the second position opening media path branch PB2-1 to standard output bin 601. Drive mechanism 300 and drive motor 301 did not need to be used and no drive gear actuation is needed to send a media sheet to standard output bin 601.

Figure 10:
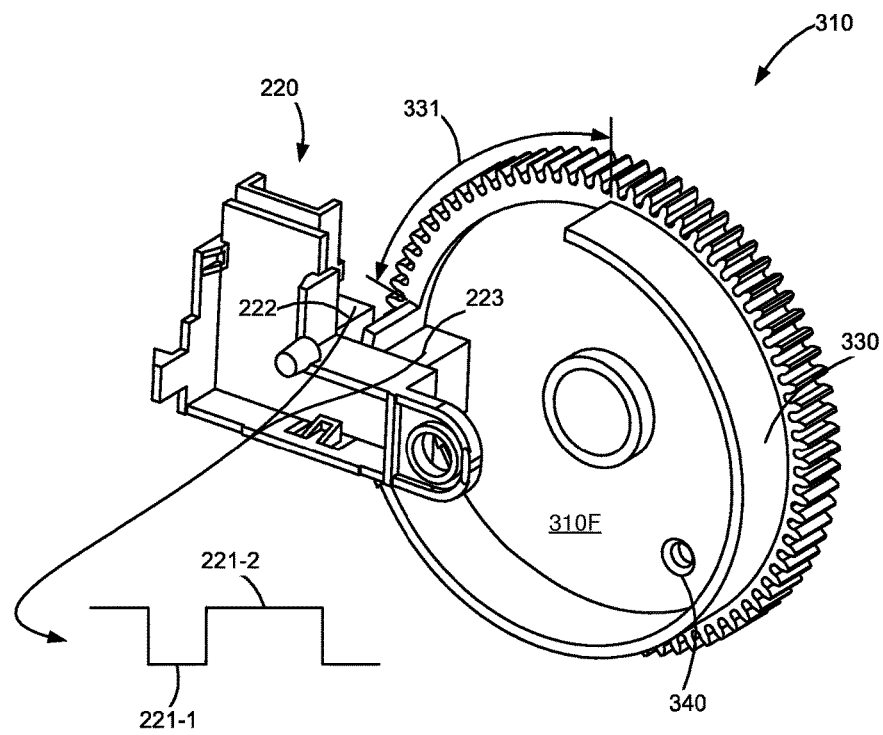
FIG. 10 shows a side perspective view of a front face of a drive gear having a circumferential flag rib and an adjacent home position sensor.

In FIG. 10, home position sensor 220 is illustrated to be an optical interrupter including an LED 222 and a photoreceptor 223. When it is determined, for example, that a drive gear is to be returned to its home position, flag rib 330 rotates through home position sensor 220 until the gap 331 has been reached, changing the state of the output signal 221 to first state 221-1. When drive gear 310 is rotated away from its home position, flag rib 330 enters between LED 222 and photoreceptor 223 and changes the state of the output signal 221 to second state 221-2. Other types of mechanisms for driving gears and sensing gear positions are known in the art and the illustrated structure shown for doing this should not be considered as limiting.

While the drive gears, such as drive gears 310A-310C, are returned at their respective home positions upon delivery of a media sheet to a predetermined one of the destinations 600, it is understood, however, that the drive gears need not be returned to their respective home positions. Instead, controller 103 may determine a current rotational position of at least one of the drive gears, such as drive gear 310A, based on previous control signals sent to drive motor 301 and drive motor 301 is then driven by controller 103 to rotate the drive gears from their current rotational position to the desired rotational position. The home position of the at least one drive gear 310 may be stored on memory 111 of the imaging device 102 for reference by controller 103 in actuating media diverter system 200.

Figure 13A:
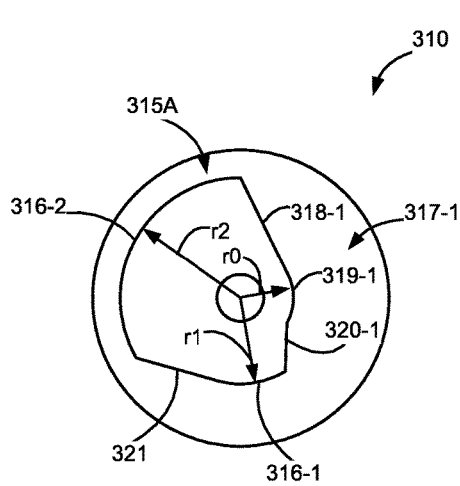
FIGS. 13A-13B each show a drive gear having a modified lobe having three camming surfaces allowing for a gate to be moved through three positions.
Figure 13B:
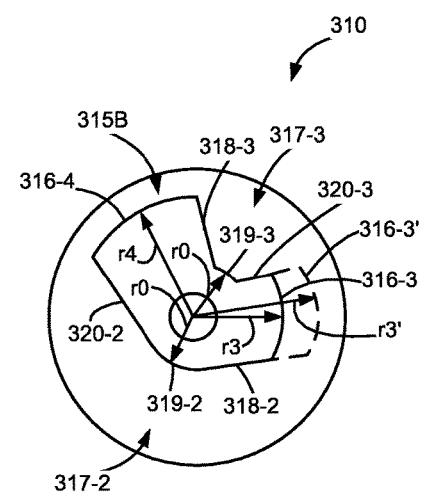

It is understood that a number of output destinations 600 may be based on a number of diverter assemblies 400 and the number of positions each gate 401 can move between. For the two-position gates illustrated in the diverter assemblies 400 as described above, for N number of diverter assemblies there are N+1 output destinations. For example, for three two-position diverter assemblies there are four output destinations. In another aspect, should each diverter assembly have a gate positionable between three positions through the use of a modified lobe having three camming surfaces allowing for an intermediate position, then for N diverter assemblies, there are 2N+1 output destinations, such as shown in FIGS. 13A and 13B which will be discussed in further detail below. For example, for three three-position diverter assemblies there are seven outputs. It will be recognized that two-position and three-position diverter assemblies may be used together.

In having a diverter mechanism including a single stepper motor for actuating multiple diverter assemblies according to the above-mentioned teachings of the present disclosure, device size and costs are reduced.

FIGS. 11A-11E schematically show an alternative arrangement of diverter assemblies in a four-stage media diverter system. In FIGS. 11A-11E, the diverter assemblies are represented by drive gears 310 having lobes 315, and its components are generally the same in operation and carry similar reference numerals as the diverter assembly 400 described above. Gates 401 are represented by the lines labeled G1-G4. Media input 201 is shown at the bottom of media path P. As shown, four diverter assemblies are arranged in a line or stack. In each of FIGS. 11A-11E, one diverter assembly is assigned at each stage (stages S1, S2, S3, S4).

Gates G1-G3 have outputs that either open to their respective output destinations 600A-600C indicated by the small solid squares or to another diverter assembly in the stack, while gate G4 has outputs that open to either output destination 600D or 600E. Stage S1 diverter assembly is coupled to output gear 303 that is coupled to drive motor 301. An idler gear 350 is provided between adjacent stages S1-S2, S2-S3 and S3-S4. In these examples, the plurality of drive gears 310 are rotated simultaneously in the same amount and direction to open gates G1-G4 in sequence. In FIG. 11A, gate G1 has been moved from its initial position to direct a media sheet from input 201 to destination 600A. In FIG. 11B, gate G2 has been moved from its initial position to direct a media sheet from input 201 to destination 600B while gate G1 has returned to its initial position. In FIG. 11C, gate G3 has been moved from its initial position to direct a media sheet from input 201 to destination 600C with gates G1-G2 returning to their initial positions. In FIG. 11D, gate G4 has been moved from its initial position to direct a media sheet from input 201 to destination 600D with gates G1-G3 returning to their initial positions. Lastly, in FIG. 11E, all gates G1-G4 are in their initial positions and the media sheet is directed to destination 600E. Again a single drive motor is used to drive all of the gates.

Figure 12B:
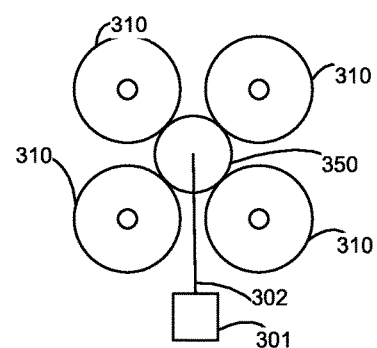
Figure 12C:
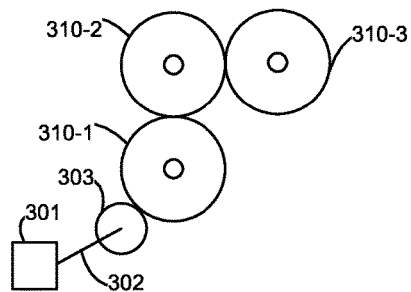
FIG. 12C shows a three diverter system where the gates rotate in opposite directions and no idlers gears are used.

FIGS. 12A-12B illustrate two further embodiments of a media diverter system. In FIG. 12A, a four diverter assembly system is shown. There, the four drive gears 310 are coupled to idler gear 350. Output gear 303 is coupled to one of the four drive gears 310. In FIG. 12B, the idler gear has been replaced with the output gear 303 to directly drive each of the four drive gears 310. FIG. 12C shows another embodiment of a media diverter system. There, output gear 303 is coupled to one of the three drive gears 310, drive gear 310-1 as shown. Drive gear 310-1 is coupled to drive gear 310-2 that in turn is also coupled to drive gear 310-3. No idler gears are used. With this embodiment, drive gear 310-2 rotates in a direction opposite to drive gears 310-1 and 310-3. Thus, the drive gears in the media diverter system do not all need to rotate in the same direction.

As aforementioned, a length of each up camming surface 316 is based on a full rotation of a drive gear divided by the number of diverter assemblies—presuming that there is one lobe on each of the drive gears in the media diverter system. For each of the four drive gears 310 in FIGS. 12A-12B, the up camming surfaces may have an arc length of about 90 degrees while the arc length of the down camming surfaces would have an arc length of about 270 degrees. In basing an arc length of a camming surface 316 for a drive gear 310 on the number of diverter assemblies, a rotational amount needed to translate pivot arms 410 between the first and the second positions in the diverter assemblies can be controlled to effectively direct media sheet M from the input path 201 to the predetermined output destination 600 within a particular amount of time. The camming surfaces can be designed to have arc lengths that would allow for smooth transfer of media sheet M from one diverter assembly to one or more downstream diverter assemblies. For example an arc length of an up camming surface may be selected to be not so long as to cause delay, paper jams, etc., and also not so short as to cause unexpected deliveries to the output destinations. Thus, respective arc lengths for up and down camming surfaces can have equal or varying lengths depending on an overall design of the media diverter system. For the three diverter assembly system, each up camming surface 316 has an arc length of about 120 degrees while each down camming surface 317 of the lobe has an arc length of about 240 degrees.

FIGS. 13A and 13B show alternative arrangements of camming surfaces in a lobe 315 for allowing corresponding gate 410 to be positioned between three positions. The drive gear and components thereof shown in FIGS. 13A and 13B will carry similar reference numerals and structure as drive gear 310 and its components in the abovementioned figures. FIG. 13A shows a lobe 315A having two up camming surfaces adjacent each other and a down camming surface, while FIG. 13B shows two up camming surfaces and two down camming surfaces alternating. Lobes 315A and 315B of FIGS. 13A and 13B each to engage with end 412 of a pivot arm 410 for moving a corresponding gate 401 between the three positions. In providing an additional up camming surface on the drive gear, a corresponding gate may be moved at another angle relative to the horizontal or the media path such that another media path branch is opened/closed. In having a gate 401 moveable between three positions, additional output destinations can be provided or fewer diverter assemblies would be needed.

FIG. 13A shows drive gear 310 with a lobe 315A having two up camming surfaces labeled 316-1, 316-2 and a down camming surface 317-1 including first, center, and second end portions 318-1, 319-1, and 320-1, respectively. Up camming surfaces 316-1 and 316-2 are disposed adjacently and connected to each other via a transition surface 321. Radial lines r0, r1 and r2 define respective distances of down camming surface 317-1, up camming surfaces 316-1 and 316-2 from the center of the drive gear 310. As illustrated, radial line r2 is greater than radial line r1 which is greater than radial line r0 to show that up camming surface 316-2 is farther from the center of the drive gear 310 than that of up camming surface 316-1 and that up camming surface 316-1 is farther from the center of the drive gear 310 than the center portion 319-1 of down camming surface 317-1. In varying distances of up camming surfaces relative to the center of the drive gear 310, an additional up or third position of the gate may be established. In this context, the attached gate may be actuated at another angle relative to the horizontal defined by the input 201 or the media path branch.

FIG. 13B shows drive gear 310 with a lobe 315B having two up camming surfaces 316-3, 316-4 and two down camming surfaces 317-2, 317-3. Each of down camming surfaces 317-2 and 317-3 includes first, center, and second end portions 318-2, 319-2, 320-2; and 318-3, 319-3, 320-3, respectively. In FIG. 13B, each of down camming surface 317-2 and 317-3 is disposed between up camming surfaces 316-3, 316-4 such that up and down camming surfaces are alternating. Radial lines r0 indicate the distance from the center of drive gear 310 to center portions 319-2, 391-3 of down camming surfaces 317-2, 317-3, respectively. Radial lines r3, r4 indicate the distance of up camming surfaces 316-3, 316-4, respectively from the center of the drive gear 310. Similar to FIG. 13A, radial line r4 is illustrated to be greater than r3 to show that up camming surface 316-4 is farther from the center of drive gear 310 than that of up camming surface 316-3, thereby having an additional (third) up position, and that both are greater than r0. Radial lines r3, r4 can be the same lengths as shown by radial line r3' and up camming surface 316-3' shown in dashed line where radial line r3'=radial line r4.

With reference back to FIG. 13A, an example home position of lobe 315A may be at the position where the end of a corresponding pivot arm is in contact with center portion 319-1 of the down camming surface 317-1 such that the attached gate is initially in the second or down position (see gate 401 of FIG. 7B). Now, presuming, for example, that lobe 315A is in the example home position, rotating the drive gear 310 in the counterclockwise direction results in the end of the pivot arm sliding from center portion 319-1, along end portion 320-1, to up camming surface 316-1. In this manner, the corresponding gate is moved from the down position to the first up position. Further rotating the lobe 315 in the counterclockwise direction results in the end of the pivot arm riding along transition surface 321 to up camming surface 316-2. Since up camming surface 316-2 is farther from the center of the gear relative to up camming surface 316-1, the end of the corresponding pivot arm is moved further downward by contact with the up camming surface 316-2 and the attached gate is moved to another (additional) position. Using the position of gate 401 on FIG. 7A as a basis, transitioning from up camming surface 316-1 to up camming surface 316-2 causes the gate 401 to move at a distance greater than illustrated D1, thereby opening another media path branch. Transition surface 321 eases this transition from the first (up) position to another up position. From up or second camming surface 316-2, rotating the drive gear in the counterclockwise direction causes the end of the pivot arm to slide to down camming surface 317-1, causing the corresponding gate to move in the down or home position again. End portion 318-1 allows this transition from up camming surface 316-2 to center portion 319-1 thereof. In positioning down camming surface 317-1 adjacent to up camming surface 316-1 and up camming surface 316-1 to up camming surface 316-2 (in a clockwise order), the gate is moved in a sequential manner. Specifically, gate 401 is moved from the down position (illustrated in FIG. 7B) to the first up position (illustrated in FIG. 7A) to a second higher up position. As would be understood by those of skill in the art, when more than two output positions are possible with a gate, a first set of blocking fingers or a similar device would be provided on the gate to prevent a media sheet from entering any intermediate output position output when the gate is at the highest output position and a second set of blocking devices would be provided to prevent the media from entering a higher positioned output when the gate was positioned at an intermediate output location.

In FIG. 13B, an example home position of lobe 315B may be that the end of the pivot arm is in contact with up camming surface 316-3. When the drive gear is rotated in a counterclockwise direction, the end of the pivot arm moves from up camming surface 316-3 to down camming surface 317-2. Further rotation of the drive gear causes the end of the pivot arm to move from the (first) down camming surface 317-2 to the (second) up camming surface 316-4 and from thereto (second) down camming surface 317-3 and back to the (first) up camming surface 316-3. A full counterclockwise rotation of the drive gear 310 causes the end of the pivot arm to engage with an up and a down camming surface alternately. Herein, the down camming surfaces may be viewed as transition areas. Albeit alternating, since up camming surface 316-4 is farther from the gear center than up camming surface 316-3, the end of the pivot arm is moved at a greater angle being in contact with up camming surface 316-4 than when being in contact with up camming surface 316-3. Using FIGS. 7A-7B as basis, for example, when the end of the pivot arm is in contact with either of down camming surfaces 317-2 and 317-3, the gate 401 is moved in the second or down position (FIG. 7B). Accordingly, when the end of the pivot arm is in contact with up camming surface 316-3, gate 401 is moved to the first up position (FIG. 7A), and when in contact with the other up camming surface 316-4, causing gate 401 to move further upward at a distance greater than D1. From the arrangement of camming surfaces in FIG. 13B, movement of gate 401 may be from a down position to one of a second up position or third up position then again the down position to the other of the second or third up positions.

Figure 14:
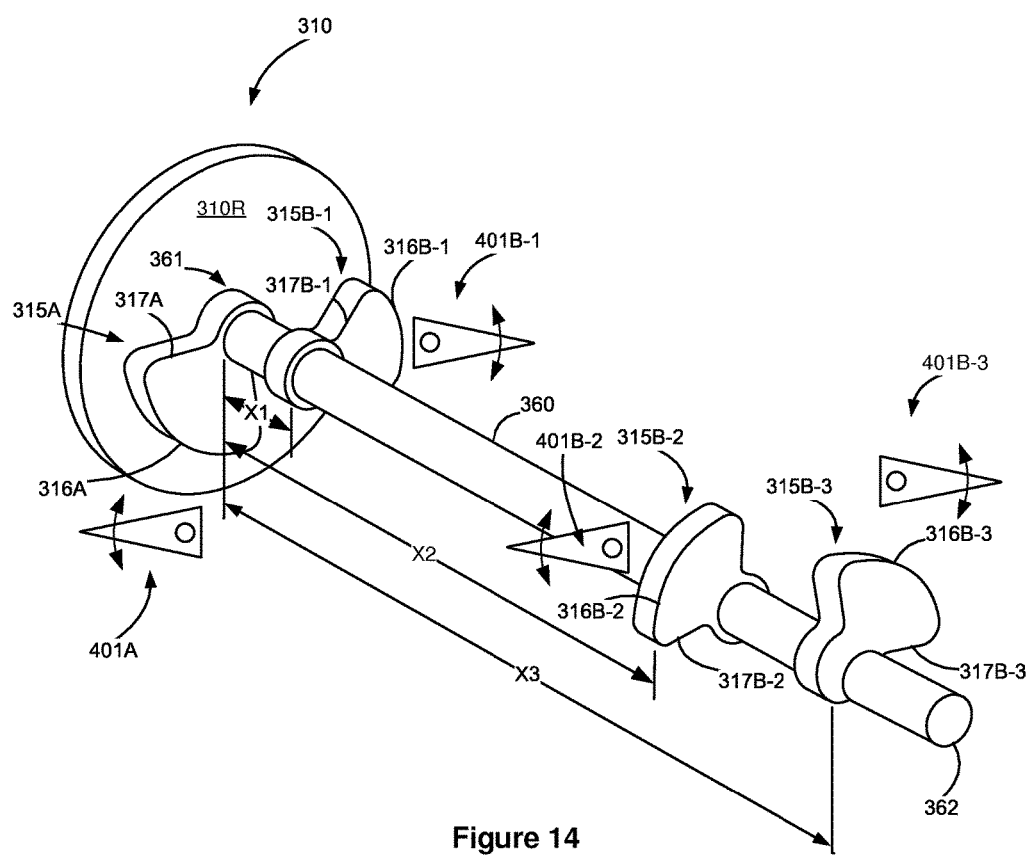
FIG. 14 is a side perspective view of a drive gear including a shaft axially extending from a central portion thereof having multiple lobes.

FIG. 14 illustrates another example embodiment of a drive gear 310 that includes a shaft 360 having multiple lobes 315A, 316B-1-316B-3. Drive gear 310 includes a lobe 315A on its rear face 310R. Shaft 360 includes a plurality of lobes 315B-1, 315B-2, and 315B-3 disposed along the length of shaft 360 between its first and second ends 361, 362 and radially extending therefrom. Lobes 315B-1-315B-3 are disposed along shaft 360 at respective predetermined axial distances X1-X3 from lobe 315A. Distances X1-X3 are a matter of design choice and not of limitation. Lobes 315A, 315B-1-315B-3 include respective up camming surfaces 316A, 316B-1-316B-3 and respective down camming surfaces 317A, 317B-1-317B-3 angularly oriented about shaft 360. Lobes 315B-1, 315B-2 and 315B-3 may be separate components having annular portions for sliding through shaft 360 or may be formed as part of the shaft. Up camming surfaces 316A, 316B-1-316B-3 and down camming surfaces 317A, 317B-1-317B-3 have respective predetermined arc lengths of approximately 90 degrees and 270 degrees. Up camming surfaces 316B-1-316B-3 are angularly positioned to slightly overlap one another while being angularly offset from up camming surface 316A. With this arrangement of lobes, multiple gates, gates 401A, 401B-1-401B-3, can be actuated, and using the angular positions of the respective up camming surfaces sequencing of the multiple gates can be achieved. Lobes 315A, 315B-1-315B-3 operate gates 401A, 401B-1-401B-3, respectively. While drive gear 310 is illustrated as including lobe 315A, alternatively, all of the lobes 315A, 315B-1-315B-3 may be disposed on shaft 360. It should be understood that numerous variations of lobes and heights of camming surface may be incorporated into a single gear design. Shaft 360 may be a separate component secured to or screwed into a center opening of drive gear 310 and rotating simultaneously therewith. A first end 361 of shaft 360 may be removably attached to drive gear 310 or shaft 360 may be molded as part of drive gear 310.

As previously explained, each of lobes 315A, 315B-1-315B-3 is operatively engaged with the respective pivot arm of gates 401A, 401B-1-401B-3. For purposes of clarity, gates 401A, 401B-1-401B-3 are shown schematically. The shafts for each of the gates 401A, 401B-1-401B-3 would be positioned parallel to shaft 360. The media deflectors on each gate are spaced apart from the media deflectors of the other gates so that each gate is still able to move between its first and second positions. Shaft 360 and gates 401A, 401B-1-401B-3 would be rotatably mounted to the frame of the diverter system.

In operation for the embodiment shown in FIG. 14, assume that a home position occurs when the pivot arms for gates 401A, 401B-1-401B-3 are on up camming surfaces 316A, 316B-1-316B-3, respectively. A first amount of rotation of drive gear 310 in a clockwise direction, for instance, results in the pivot arms for gates 401A, 401B-1-401B-3 to slide from the corresponding up camming surfaces to the respective down camming surfaces 317A, 317B-1-317B-3, causing their corresponding gates to move to the first or up position (FIG. 7A) and opening multiple media path branches. The shape of the lobe as well as the spacing and arc lengths of camming surfaces thereof may vary according to an overall design of the media diverter system 200. More particularly, how a diverter assembly and components thereof may be arranged relative to another may be dependent on where the output destinations are located relative to input 201 of the media sheet.

The foregoing descriptions of example embodiments of the present disclosure have been presented for purposes of illustration. It is not intended to be exhaustive or to limit the present disclosure to the precise steps and/or forms disclosed, and obviously many modifications and variations are possible in light of the above description. It is intended that the scope of the present disclosure be defined by the claims appended hereto.

What is claimed is:

1. A multi-path media diverter system for selectively directing a media sheet from a media path to one of a plurality of output destinations, the media diverter system comprising:

a frame;

a first stage diverter assembly having an input and a first output and at least one second output, the input of the first stage diverter assembly in communication with the media path and sized to receive the media sheet;

at least one second stage diverter assembly having an input and a first and at least one second output, the input of the at least one second stage diverter assembly in communication with one of the first and the at least one second outputs of the first stage diverter assembly, and the first and the at least one second outputs of the at least one second stage diverter assembly in communication with a respective first and at least one second output destination in the plurality of output destinations;

each of the first and the at least one second stage diverter assemblies comprising:

a gate extending across the media path and moveable between a first position and at least one second position to direct a media sheet to the first output and to the at least one second output, respectively, the gate having a shaft rotatably mounted to the frame, and a pivot arm radially extending from the shaft and having two free ends;

a drive gear rotatably mounted to the frame, the drive gear having a lobe thereon, the lobe having a first and at least one second camming surface having a respective first and second lengths for engaging with a first free end of the pivot arm, wherein, when the first free end of the pivot arm is on the first camming surface, the gate is in one of the first and the at least one second positions, and, when the first free end of the pivot arm is on the at least one second camming surface, the gate is in the other of the first and the at least one second positions; and, a biasing member having a first end attached to the frame and a second end attached to a second free end of the pivot arm for biasing the gate toward one of the first and the at least one second positions;

and, a drive mechanism having a single drive motor operably coupled to the drive gears of the first and the at least one second stage diverter assemblies, wherein as the respective drive gears are rotated by the drive motor, the input of the first stage diverter assembly is sequentially connected to each output destination in the predetermined plurality of output destinations.

2. The multi-path media diverter system of claim 1, wherein the drive gear of the first stage diverter assembly and the drive gear of the at least one second stage diverter assembly are coupled to an idler gear rotatably mounted to the frame; and, the drive motor is a stepper motor having an output shaft having an output gear with the output gear coupled to one of the first stage diverter assembly drive gear and the at least one second stage diverter assembly drive gear.

3. The multi-path media diverter system of claim 1, wherein the drive motor is a stepper motor having an output shaft having an output gear coupled to each drive gear of the first and the at least one second stage diverter assemblies.

4. The multi-path media diverter system of claim 1, wherein the other of the first and the at least one second outputs of first stage diverter assembly is in communication with an input of a second at least one second stage diverter assembly, the second at least one second stage diverter assembly having a first and at least one second output in

23 communication with a respective third and at least one fourth output destination in the plurality of output destinations.

5. The multi-path media diverter system of claim 1, wherein the length of the first camming surface of each drive gear extends through an arc of 360 degrees divided by the total number of drive gears in the multi-path diverter system.

6. The multi-path media diverter system of claim 5 wherein the at least one second stage diverter assemblies comprises two second stage diverter assemblies and further wherein the length of the first camming surface of each drive gear extends through of an arc of about 120 degrees.

7. The multi-path media diverter system of claim 1, further comprising the drive gear of one of the first stage diverter assembly and the at least one second stage diverter assembly having a home position indicator; and, a home position sensor mounted on the frame for sensing the home position indicator, the home position sensor having an output signal having a first state when the home position indicator is not present at the home position sensor and a second state when the home position indicator is present at the home position sensor indicating that the first and at least one second stage diverter assemblies are in an initial position.

8. The multi-path media diverter system of claim 1, wherein the at least one second outputs of one of the first stage diverter assembly and the at least one second stage diverter assembly comprise second second output and the lobe of corresponding drive gear has a third camming surface having a radial length that is greater than a radial length of the first camming surface and less than or equal to a radial length of the second camming surface, wherein, when the first free end of the pivot arm is on the third camming surface, the input of one of the first stage diverter assemblies and the at least one second stage diverter assembly is communication with the respective second second output.

9. The multi-path media diverter system of claim 8 wherein the third camming surface is connected at one end to the first camming surface and at the other end to one end of the second camming surface, and the other end of the second camming surface is connected to the other end of the first camming surface.

10. The multi-path media diverter system of claim 8 wherein the third camming surface is connected at one end to one end of a first portion of the first camming surface and at the other to one end of a second portion of the first camming surface and the second camming surface is connected at one end to the other end of the first portion of the first camming surface and the other end to the other end of the second portion of the first camming surface.

11. A media diverter system for use in an imaging device and for selectively opening and closing one of a plurality of paths for directing a media sheet on a media path in the imaging device to one of a plurality of output destinations, the media diverter system comprising:
  a frame;
  a first stage diverter assembly having an input and a first and a second output, the input of the first stage diverter assembly in communication with the media path and sized to receive the media sheet thereon;
  a first and a second second stage diverter assembly each having an input and a first and a second output, the input of the first second stage diverter assembly in communication with the first output of the first stage diverter assembly and the input of the second second stage diverter assembly being in communication with the second output of the first state diverter assembly;
  each of the first and the first and second second stage diverter assemblies comprising:
    a gate extending across the media path and moveable between a down position and an up position to direct the media sheet to respective first and second outputs, each gate having a shaft rotatably mounted to the frame and a pivot arm radially extending from an end of the shaft and having a first and a second end;
    a drive gear rotatably mounted to the frame, the drive gear having a lobe providing an up camming surface having a first predetermined arc length and a down camming surface having a second predetermined arc length wherein, when the first end of the pivot arm is on the down camming surface, the gate is in the down position, and, when the first end of the pivot arm is on the up camming surface, the gate is in the up position; and,
    a biasing member having a first end attached to the frame and a second end attached to the second end of the pivot arm for biasing the gate toward one of the down and up positions;
  and,
  a drive mechanism having a single motor for synchronously rotating the drive gears of the first stage diverter assembly and the first and second second stage diverter assemblies,
  wherein the lobes of each of the drive gears are arranged rotationally offset relative to each other such that:
    in an initial position, the gate of the first diverter assembly is in the up position, the gate of the first second stage diverter assembly is in the up position and the gate of the second second stage diverter assembly is in the down position forming a path between the input through the second output of the first diverter assembly to the input and through the first output of the second second stage diverter assembly to a first output destination in the plurality of output destinations;
    a first amount of rotation in a first direction by each drive gear moves the gate of the first stage diverter assembly to the down position and gate of the first second stage diverter assembly remains in the up position forming a second path from the input through the first output of the first stage diverter assembly to the input and through the second output of the first second stage diverter assembly to a second output destination in the plurality of output destinations;
    a second amount of rotation in the first direction subsequent to the first amount of rotation moves the gate of the first second stage diverter assembly to the down position and gate of the first stage diverter assembly remains in the down position forming a third path from the input through the first output of the first stage diverter assembly to the input and through the first output of the first second stage diverter assembly to a third output destination in the plurality of output destinations;
    a third amount of rotation in the first direction subsequent to the second amount of rotation returns the gate of the first stage diverter assembly to the up position and moves gate of the second second stage diverter assembly to the up position forming a fourth path from the input through the second output of the first stage diverter assembly to the input and through the second output of the second second stage diverter assembly to a fourth output destination in the plurality of output destinations; and,
a fourth amount of rotation in the first direction subsequent to the third amount of rotation returns the drive gears of the first stage diverter assembly and the first and second second stage diverter assemblies to their respective initial positions.

12. The media diverter system of claim 11, wherein the drive gears of the first stage diverter assembly and the first and second second stage diverter assemblies are coupled to an idler gear rotatably mounted to the frame and the drive motor is a stepper motor having an output shaft having an output gear with the output gear coupled to one of the first stage diverter assembly drive gear, the first second stage diverter assembly drive gear and the second second stage diverter assembly drive gear.

13. The media diverter system of claim 11, wherein the drive motor is a stepper motor having an output shaft having an output gear coupled to each drive gear of the first stage diverter assembly and the first and second second stage diverter assemblies.

14. The media diverter system of claim 11 wherein the first output destination is a standard media output bin of the imaging device, the second output destination is a first mail box of the imaging device, the third output destination is a second mail box, and the fourth output destination is a finisher.

15. The media diverter system of claim 11 wherein the length of the up camming surface of each drive gear extends through of an arc of about 120 degrees.

16. The media diverter system of claim 11 wherein the length of the down camming surface of each drive gear extends through of an arc of about 240 degrees.

17. The media diverter system of claim 11, further comprising the drive gear of one of the first stage diverter assembly and the first and second second stage diverter assemblies having a home position indicator; and, a home position sensor mounted on the frame for sensing the home position indicator, the home position sensor having an output signal having a first state when the home position indicator is not present at the home position sensor and a second state when the home position indicator is present at the home position sensor indicating the first stage diverter assembly and the first and second second stage diverter assemblies are in their initial positions.

18. The media diverter system of claim 17 wherein the home position indicator is a flag rib axially extending from a face of the drive gear of one of the first stage diverter assembly and the first and second second stage diverter assemblies encompassing a sector of the circumference thereof and axially extending therefrom; and the home position sensor is an optical interrupter type sensor.

19. A media diverter system for selectively directing a media sheet from a media path in an imaging device to an output destinations on an imaging apparatus, the media diverter system comprising:
a frame;
a first stage diverter assembly having an input and a first and a second output, the input of the first stage diverter assembly in communication with the media path from the imaging device and sized to receive the media sheet, and, the first output of the first stage diverter assembly in communication with a first output destination;
a second stage diverter assembly having an input and a first and a second output, the input of the second stage diverter assembly in communication with the second output of the first stage diverter assembly, the first output of the second stage diverter assembly in communication with a second output destination;
a third stage diverter assembly having an input and a first and a second output, the input of the third stage diverter assembly in communication with the second output of the second stage diverter assembly, the first output of the third stage diverter assembly in communication with a third output destination;
a fourth stage diverter assembly having an input and a first and a second output, the input of the fourth stage diverter assembly in communication with the second output of the third stage diverter assembly, the first output of the third stage diverter assembly in communication with a fourth output destination and the second output of the third stage diverter assembly in communication with a fifth output destination;
each of diverter assemblies comprising:
a gate extending across the media path and moveable between a first position and a second position to direct the media sheet from the input to the first and second outputs, respectively, the gate having a shaft rotatably mounted to the frame, the shaft having a pivot arm radially extending from the shaft having a first and a second end;
a drive gear rotatably mounted to the frame, the drive gear having a lobe providing an up camming surface having an arcuate shape and a down camming surface having a generally planar shape for engaging with the second end of the pivot arm, wherein, when the second end of the pivot arm is on the up camming surface, the gate is in the first position, and, when the second end of the pivot arm is on the down camming surface, the gate is in the second position; and,
a biasing member having a first end attached to the frame and a second end attached to the first end of the pivot arm to bias the gate toward the first position; and,
a drive mechanism having:
a single drive motor for synchronously rotating the drive gears of the first, second, third and fourth stage diverter assemblies in the same direction, the drive motor rotatably coupled to the drive gear of the first stage diverter assembly;
a first idler gear coupled between the drive gears of the first and second stage diverter assemblies;
a second idler gear coupled between the drive gears of the second and third stage diverter assemblies;
a third idler gear coupled between the drive gears of the third and fourth stage diverter assemblies; and
the first, second and third idler gears rotatably mounted to the frame;
wherein, during one rotation of the drive gears of the first through fourth stage diverter assemblies, the input of the first stage diverter assembly will be sequentially in communication with the first through fifth output destinations.

20. The media diverter system of claim 19 wherein the drive motor is a stepper motor having an output shaft having an output gear with the output gear coupled to the first stage diverter assembly drive gear.

21. The media diverter system of claim 19, further comprising the drive gear of one of the first through four stage diverter assemblies having a home position indicator; and; a home position sensor mounted on the frame for sensing the home position indicator, the home position sensor having an output signal having a first state when the home position indicator is not present at the home position sensor and a second state when the home position indicator is present at the home position sensor indicating the first stage and first and second second stage diverter assemblies are in their initial position.

22. The media diverter system of claim 21, wherein the home position sensor comprises a photo emitter and a photo receiver positioned opposite thereto for sensing an amount of light from the photo emitter, and, wherein the home position indicator is a circumferential flag rib having a gap therein indicating a home position, the flag rib being rotatable between the photo emitter and the photo receiver, the home position sensor operative to send an output signal that changes state when the gap is sensed indicating that the first through fourth stage diverter assemblies are in an initial position.

* * * * *